United States Patent
Ceruti et al.

(10) Patent No.: US 9,258,194 B2
(45) Date of Patent: Feb. 9, 2016

(54) METHOD AND APPARATUS TO DISPLAY A TRANSPORT SERVICE BETWEEN POINT A AND POINT Z

(75) Inventors: Michael J. Ceruti, Naperville, IL (US); Aaron M. Trickey, Naperville, IL (US); Sam S. Dweik, Bolingbrook, IL (US); Siva S. Muthusamy, Lisle, IL (US); Manikandan B. Karur, Naperville, IL (US); Matthew O. Cowles, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 259 days.

(21) Appl. No.: 11/805,086

(22) Filed: May 22, 2007

(65) Prior Publication Data

US 2008/0291196 A1    Nov. 27, 2008

(51) Int. Cl.
  *H04L 12/24* (2006.01)
  *H04L 12/26* (2006.01)

(52) U.S. Cl.
  CPC ............... *H04L 41/22* (2013.01); *H04L 12/26* (2013.01); *H04L 41/12* (2013.01); *H04L 43/0811* (2013.01); *H04L 41/0631* (2013.01)

(58) Field of Classification Search
  USPC .................................. 709/224; 715/734–737
  See application file for complete search history.

(56) References Cited

U.S. PATENT DOCUMENTS

| | | | |
|---|---|---|---|
| 5,872,911 A | 2/1999 | Berg | |
| 6,108,702 A | 8/2000 | Wood | |
| 6,118,936 A | 9/2000 | Lauer et al. | |
| 6,771,287 B1* | 8/2004 | Walker et al. | 715/736 |
| 2001/0042118 A1* | 11/2001 | Miyake et al. | 709/223 |
| 2003/0093709 A1 | 5/2003 | Ogawa et al. | |
| 2003/0099202 A1 | 5/2003 | Lear et al. | |
| 2003/0184599 A1* | 10/2003 | Beaudoin | 345/853 |
| 2004/0019676 A1* | 1/2004 | Iwatsuki et al. | 709/224 |
| 2004/0264484 A1* | 12/2004 | Kui et al. | 370/402 |
| 2005/0114779 A1 | 5/2005 | Griesmer | |

OTHER PUBLICATIONS

Dictionary.com, "adaptation," in Dictionary.com Unabridged. Source location: Random House, Inc. http://dictionary.reference.com/browse/adaptation. Available: http://dictionary.reference.com. Accessed: Jun. 4, 2010.*

"Asychnchronous Transfer Mode Switching" in Internetworking Technologies Handbook. Source Location: Cisco. http://www.cisco.com/en/US/docs/internetworking/technology/handbook/atm.pdf. Accessed: Jun. 4, 2010. (hereinafter Cisco.com), p. 27-7.*

(Continued)

*Primary Examiner* — Angela Nguyen
(74) *Attorney, Agent, or Firm* — Hamilton, Brook, Smith & Reynolds, P.C.

(57) ABSTRACT

Common techniques for displaying graphical representations of networks that summarize the network by representing the network at high level views, typically as physical network elements. In contrast, an example embodiment of the present invention simultaneously displays graphical representations for a transport service within a network by displaying network elements and connections between network entities to form graphical representations, where the graphical representations show intra-element connections, inter-element connections, and relationships between the network entities to display a transport service from point A to point Z in the network. Thus, a user can visualize a transport service and identify faults in the transport service efficiently and on a substantially real-time basis.

23 Claims, 21 Drawing Sheets

(56) References Cited

OTHER PUBLICATIONS

"Telecommunications Management Network TMN)," *Web ProForum Tutorials* http://www.iec.org p. 1-19.
A Micromuse White Paper, "Managing Today's Mission-Critical Insfrastructures: Discovery, Collection ,Correlation, and Resolution With the Netcool® Suite,"*Micromuse, Inc, Micromuse Netcool® Solutions*, pp. 1-15 (2004).
"Element Management Systems (EMSs)", *Web ProForum Tutorials* http://www.iec.org p. 1-41.
"BT Computing Partners Relies on the Netcool® Suite to Manage Network-Based Services," *BT Computing Partners Case Study, Micromuse Netcool® Solution*, 2 pages.
"Series G: Transmission Systems and Media, Digital Systems and Networks, Digital networks-General Aspects," *International Telecommunication Union (formerly CCITT Recommendation)*, ITU-T Telecommunication Standardization Sector of ITU, ITU Recommendation G.805 (Mar. 2000), 58 pages.

* cited by examiner

METHOD AND APPARATUS TO DISPLAY A TRANSPORT SERVICE BETWEEN POINT A AND POINT Z

BACKGROUND OF THE INVENTION

Network management refers generally to maintaining and administrating large-scale computer or telecommunications networks at a top level as contrasted with element management (intermediate level) and network element management (low level). Network management may be divided into separate management categories based on management tasks, such as fault, configuration, accounting, performance, and security. Fault management in particular refers to recognizing, isolating, correcting and logging faults or other network events which have a negative significance, which occur in a network.

SUMMARY OF THE INVENTION

A method or corresponding apparatus in an example embodiment of the present invention graphically represents physical network elements, network entities within the physical network elements, and connections between the network entities to form graphical representations. The graphical representations are simultaneously displayed in a manner showing intra-element connections, inter-element connections, and relationships between the network entities to display a transport service from point A to point Z in the network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
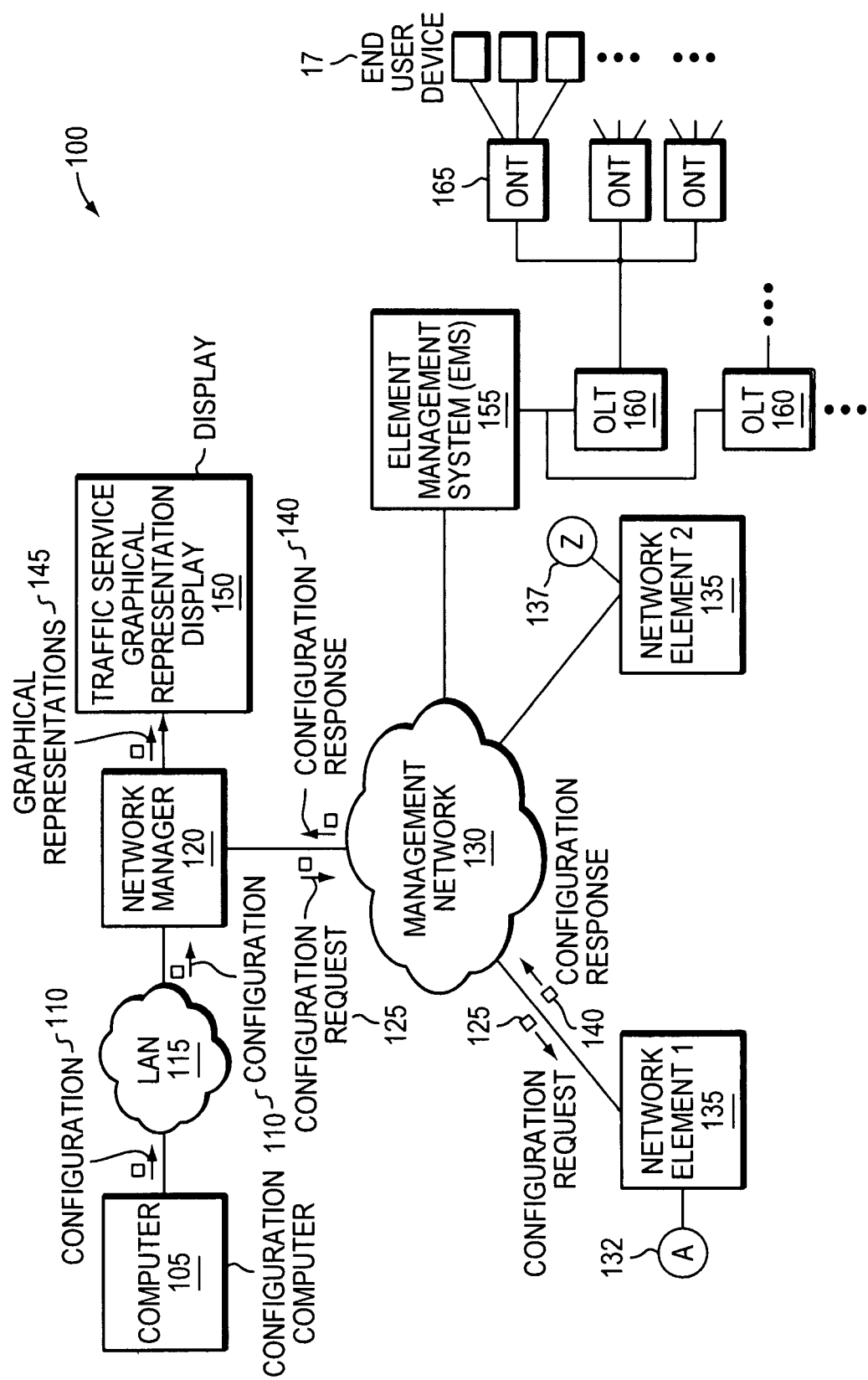
FIG. 1A is a high level network diagram of a management network with a transport service supporting communications between points A and Z in the network.

A description of example embodiments of the invention follows.

Today's network applications, such as third generation cellular 3G), have very diverse and complex mechanisms for providing transport services. In particular, after a transport service (e.g., a 3G voice call or data session) leaves a source (point A in a network) in one technology, the transport service is often contained and adapted (e.g., encapsulated, multiplexed, and de-multiplexed) by different or related technologies several times before finally arriving at a target (point Z in the network).

Common techniques for displaying graphical representations of networks summarize a network by representing the network at high level views, typically as physical network elements. In contrast, example embodiments of the present invention illustrated in FIGS. 2-6B simultaneously display graphical representations for a transport service within a network by displaying network elements and connections between network entities to form graphical representations, where the graphical representations show intra-element connections, inter-element connections, and relationships between the network entities to display a transport service from point A to point Z in the network. Thus, a user can visualize a transport service and identify faults in the transport service efficiently and on a substantially real-time basis.

A fault or a network event affecting the transport service may occur at various elements supporting the transport service, such as physical network elements, network entities within the physical network elements, and connections between the network entities. Consequently, troubleshooting and analyzing a network event affecting a transport service may be aided by a correlation technique to correlate the network event affecting the transport service with the transport service affected by the network event. In particular, to be effective, the correlation technique more than merely suppresses downstream alarms and indirect alarms on related transport service supporting elements.

Suppressing alarms attempts to isolate a root cause of a network fault and typically involves complex network information models and coding logic to reduce many alarms into a single root cause alarm. However, despite reducing the number of alarms, a user is still required to "drill down" and investigate to identify a subject transport service supporting element. As such, additional steps are undertaken before troubleshooting and resolving the network faults can begin.

In contrast, example embodiments of the present invention illustrated in FIGS. 7-11 simultaneously presents a network event representation against the graphical representations for the transport service within the network (i.e., transport service representation) to provide a visual presentation of the network event affecting the transport service in terms of the affected physical network elements, network entities, and connections. The provided visual presentation enables a viewer to visually correlate the network event affecting the transport service with the transport service affected by the network event directly.

FIG. 1A is a high level network diagram 100 of a management network 130 communicating from a point A to a point Z through use of a transport service. The network diagram 100 includes a computer 105, configuration data 110, Local Area Network (LAN) 115, network manager 120, configuration requests 125, network elements 135, point A 132, point Z 137, configuration responses 140, graphical representation 145, traffic service graphical representation 150, Element Management System (EMS) 155, Optical Line Terminals(s) (OLTs) 160, Optical Network Terminal(s) (ONTs) 165, and end user devices 170.

In operation, a computer 105, such as a configuration computer, sends the configuration data 110 over the LAN 115 to the network manager 120. After receiving the configuration 110, the network manager 120 sends a configuration request 125 via the management network 130 to a first network element 135-1. In response, the first network element-1 135 sends a configuration response 140 via the management network 130 to the network manager 120. The configuration response 140 includes a state (e.g., operational or fault) for each network component supporting a transport service (e.g., network elements, network entities, and physical and logical connections) and a relationship or baseline for each network component. In an alternative embodiment, the network manager 120 may include a storage unit (e.g., a database) or a storage unit may be located outside the network manager. The storage unit stores state and relationship information for each component.

It is useful to note that the network manager 120 may perform a configuration request 125 for each network component in a transport service (e.g., the first network element 135-1 and a second network element 135-2). It should also be understood that the network manager 120 can also send configuration requests 125 over multiple network layers or multiple transport services. Further, the network manager 120 may also communicate and manage one or more Element Management Systems (EMSs) 155, where the EMS 155 supports OLTs 160, ONTs 165, and possibly end user devices 170.

After obtaining the state of each network component, the network manager 120 generates a graphical representations 145, including a graphical representation of network components and corresponding states (e.g., operational or fault). Next, the network manager 120 sends the graphical representations 145 to a Traffic Service Graphical Representation (TSGR) display 150. The TSGR 150 then displays the graphical representation 145 to a user (e.g., a craft person display) with network elements, entities and connections in a manner that is simultaneous or in substantially real-time, as described in detail below beginning in reference to FIG. 2. It is useful to note that the graphical representations 145 may highlight or otherwise indicate a failure in a visual or auditory manner.

Figure 1B:
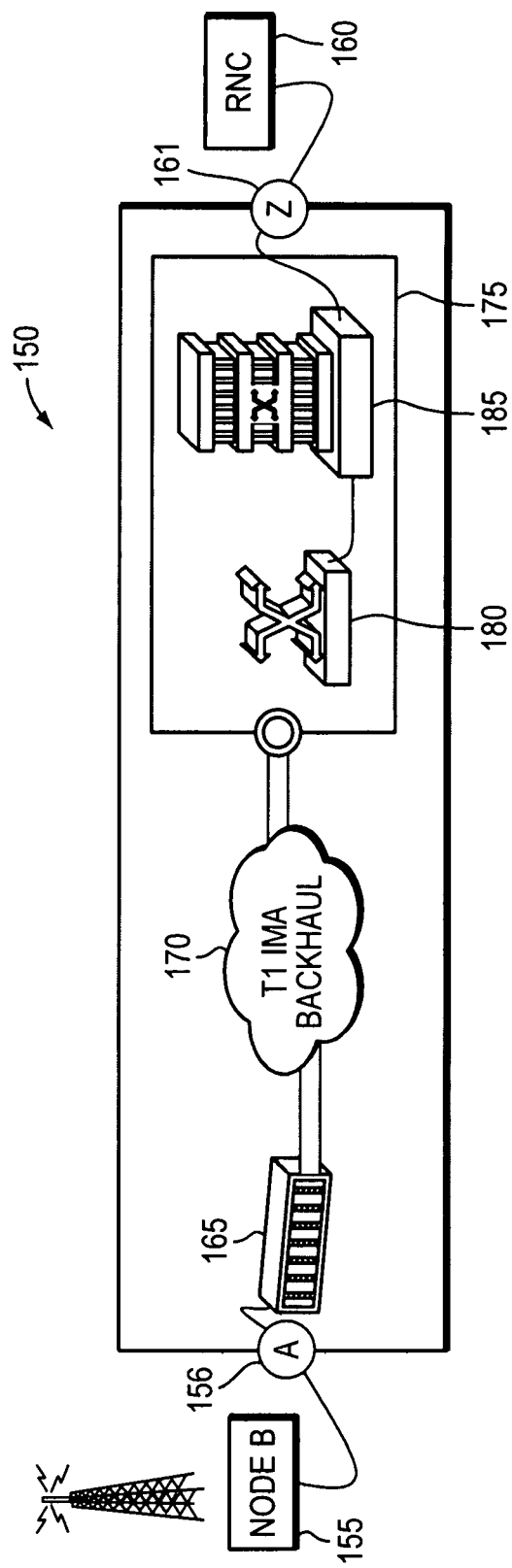
FIG. 1B is a high level network diagram of an example transport service, between points A and point Z, in the network which may be represented and visually presented by embodiments of the present invention.

In FIG. 1B, an example transport service components 150 that enables traffic between a node B 155 and a Radio Network Controller (RNC) 160 in a Universal Mobile Telecommunications System (UMTS) Radio Access Network (UTRAN). More specifically, traffic is enabled between an interface on node B 155 (i.e., point A 156) and an interface on the RNC 160 (i.e., point Z 161). The transport service 150 between point A 156 and point Z 161 is supported by a cell site aggregator 165, backhaul 170, and integrated mobile group 175, which includes a switch 180 and a router 185. Described below in reference to FIG. 2, the transport service supporting elements 165, 170, 175, 180, and 185, include network elements, network entities within the network elements, and connections between the network entities.

The example transport service 150 is but one example and is used solely for purposes of illustrating and describing embodiments of the present invention with respect to the example. While the example transport service 150 and other examples in this disclosure illustrated certain embodiments of the present invention with respect to third generation 3G) wireless, in no way are embodiments of the present invention limited to 3G wireless. One of ordinary skill in the art will readily recognize that principles of the present invention (to be further described below) are applicable to other telecommunications networks, such as Global System for Mobile Communications (GSM), General Packet Radio Service (GPRS), Code Division Multiple Access 2000 (CDMA2000), and the like. Future telecommunication networks, such as fourth generation (4G) wireless, are also within the contemplation of embodiments of the present invention.

Additionally, the principles of the present invention are also applicable to related technologies, such as Pseudowire over Multiprotocol Label Switching (MPLS). Pseudowire over MPLS is a building block upon which multiple types of traffic can be layered and then converged onto a single, multipurpose packet-switched network. For example, pseudowires may carry Time Division Multiplexing (TDM), Ethernet, Frame Relay, Asynchronous Transfer Mode (ATM) and High-Level Data Link Control/Point-to-Point Protocol (HDLC/PPP) traffic.

Moreover, these principles are equally applicable to computer networks and related technologies, such as (Asynchronous Transfer Mode (ATM) Passive Optical Network APON), Broadband Passive Optical Network (BPON), Gigibit Passive Optical Network (GPON), and the like.

Figure 2:
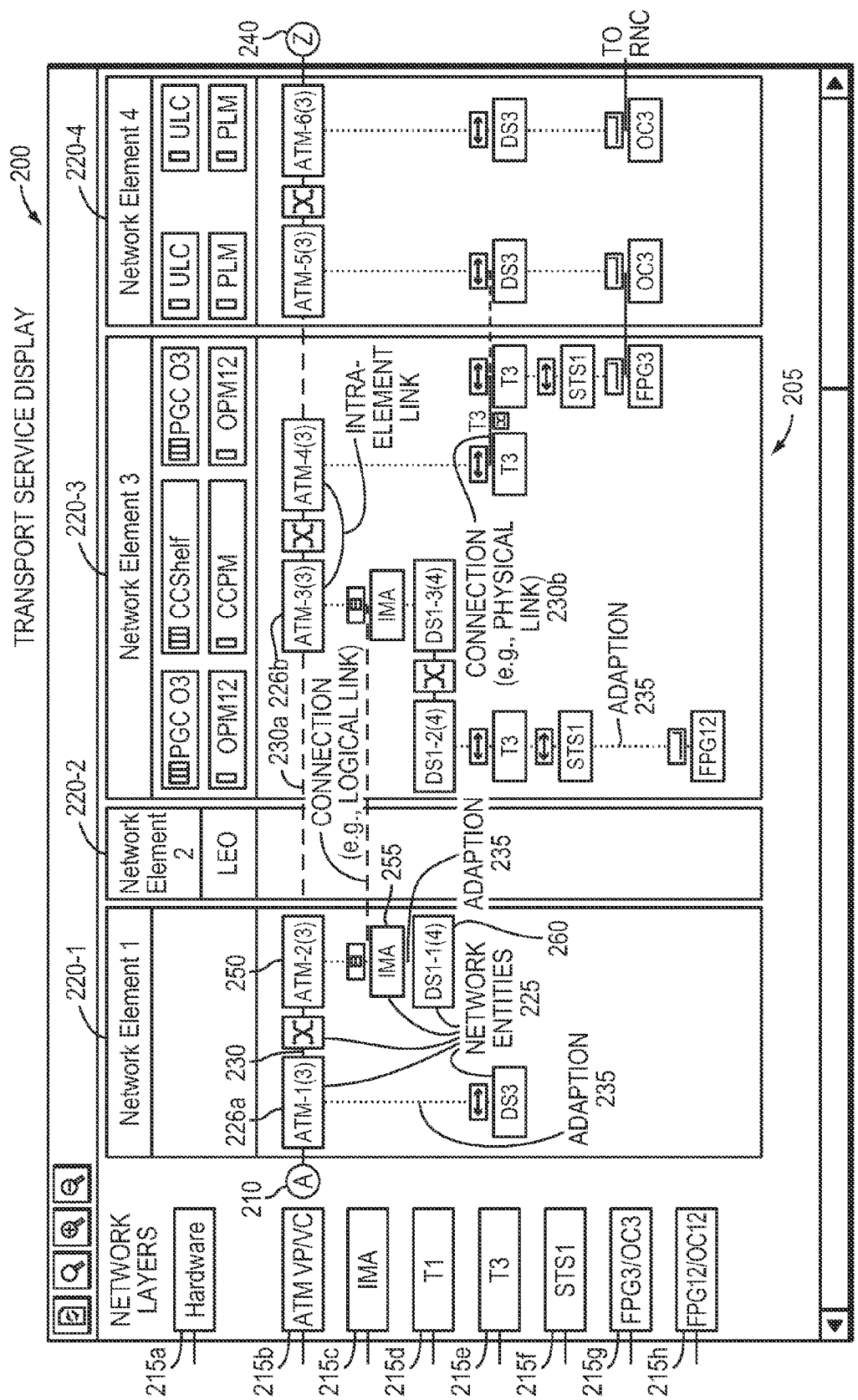
FIG. 2 is a block diagram of a transport service display in which an embodiment of the present invention is employed.

FIG. 2 is a block diagram 200 of a transport service display 200 in which an embodiment of the present invention is employed. The transport service display 200 provides a Graphics User Interface (GUI) that includes a graphical representation of network components (e.g., network elements, network entities, and connections) for a transport service. More specifically, the transport service display 200 includes a point A 210 communicating with a point Z 240, network layers 215, network elements 220 -1 . . . 4, network entities 225, connections 230a-b, and adaptions 235. In a convenient embodiment, the transport service display 200 allows a user to visually understand the transport service being displayed and quickly identify a fault in a transport service by highlighting a network component with faults, such as loss of signal (LOS) or high Bits Error Rate (BER). Further, the transport service display 20 also may provide access to network component, network manager(s), configuration information, state information, and alarm status for network components. The configuration information may be synchronized, as described below in reference to FIG. 6, with the each network component and maintained on a real-time basis.

In operation, a system employing embodiments of the present invention displays data transmissions within a transport service from point A 210 to point Z 240 over one or more network layers 215 and or one or more network components (e.g., network elements, network entities, or connections, which in some network systems, the network elements, entities and connecting may be referred to as shelves, cards, ports, logical entities, terminations, cross-connections or other typical network terms.

The transport service display 200 of FIG. 2 shows data transmission between points A and Z over an intra-element link 250. An intra-element link 250 includes multiple network entities 225 in the same network layer 215 and network element 220, as well as corresponding connections 230a-b. In example embodiments, a connection may include vertical and horizontal connections. The vertical connections are sometimes referred to as adaptions because an adaption between two communications protocols occurs as data moves vertically between network layers. It should be understood that adaptions may sometimes be referred to as adaptations. Similarly, the vertical connections may also be referred to as a containment because a containment between multiple protocols occur as data moves vertically between network layers (e.g., a T3 that contains a T2). In the present example, the network entities 225 are connected via physical connections 230a or logical connections 230b, where the connections 230a-b carry a payload between the network entities 225.

Another example transport service display 205 is an inter-element link. An inter-element link includes multiple network entities 225 on the same network layer 215 over separate network elements 220 1 . . . 4 (e.g., network element 1 and network element 2). The network elements 220 1 . . . 4 may be connected via a physical media (e.g., wires, cables, or fiber) allowing the connection payload to transmit between the network entities 225 over the physical media. Further, the transport service display 205 may also show one or more adaptions 235.

The adaption 235 representation may include a network entity 225 at one network layer 215a adapted to communicate with a network entity 225 at a different network layer 215b in the same network element 230. For example, in FIG. 2, an ATM 250 communicates via adaption 235 to Digital Signal 1 (DS1 260) over an Inverse Multiplexing for ATM (IMA) 255. In use, the IMA 255 expands ATM bandwidth of a Wide Area Network (WAN) from T1 speeds by way of the represented adaption 235.

A transport service is shown in the transport service display of FIG. 2 enabling traffic between a point A 210 and a point Z 240. The transport service between point A 210 and point Z 240 is supported by network elements 220-1 . . . 4, network entities 225 within the network elements, and physical or logical connections 230 between the network entities. In use, the transport service transmits data from point A 210 through a network entity 226a over a physical connection 230a (represented by a solid black line) to a destination network entity 250. After receiving the data, the destination network entity 250 sends the data to an ATM 226b over a logical connection 230b (represented by a dashed line). The data continues over each network entity and element via physical and logical connections unit arriving at point Z 240.

Figure 3A:
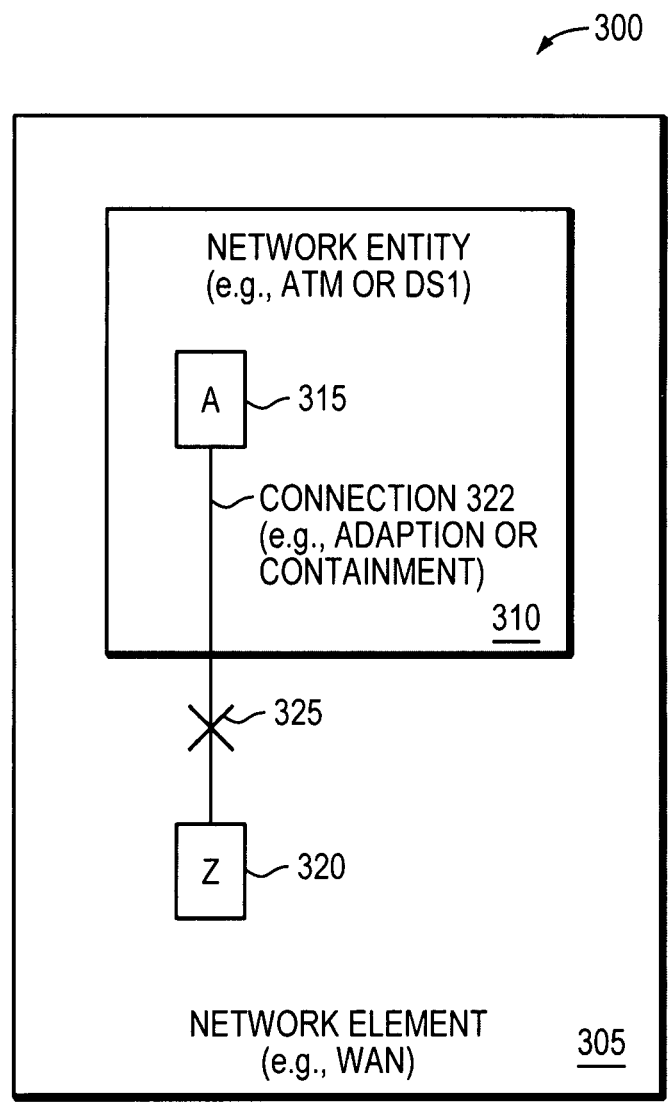
FIGS. 3A-3C are partial transport service displays of network elements, network entities, and connections in which an embodiment of the present invention is employed.
Figure 3B:
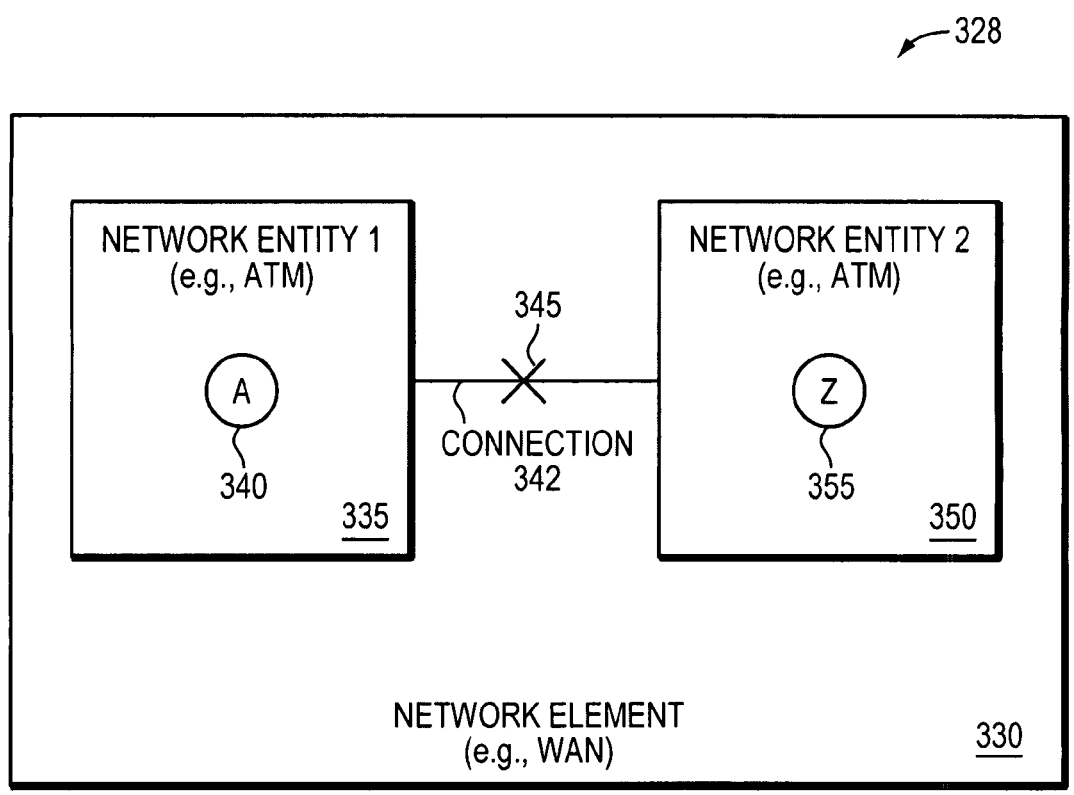
Figure 3C:
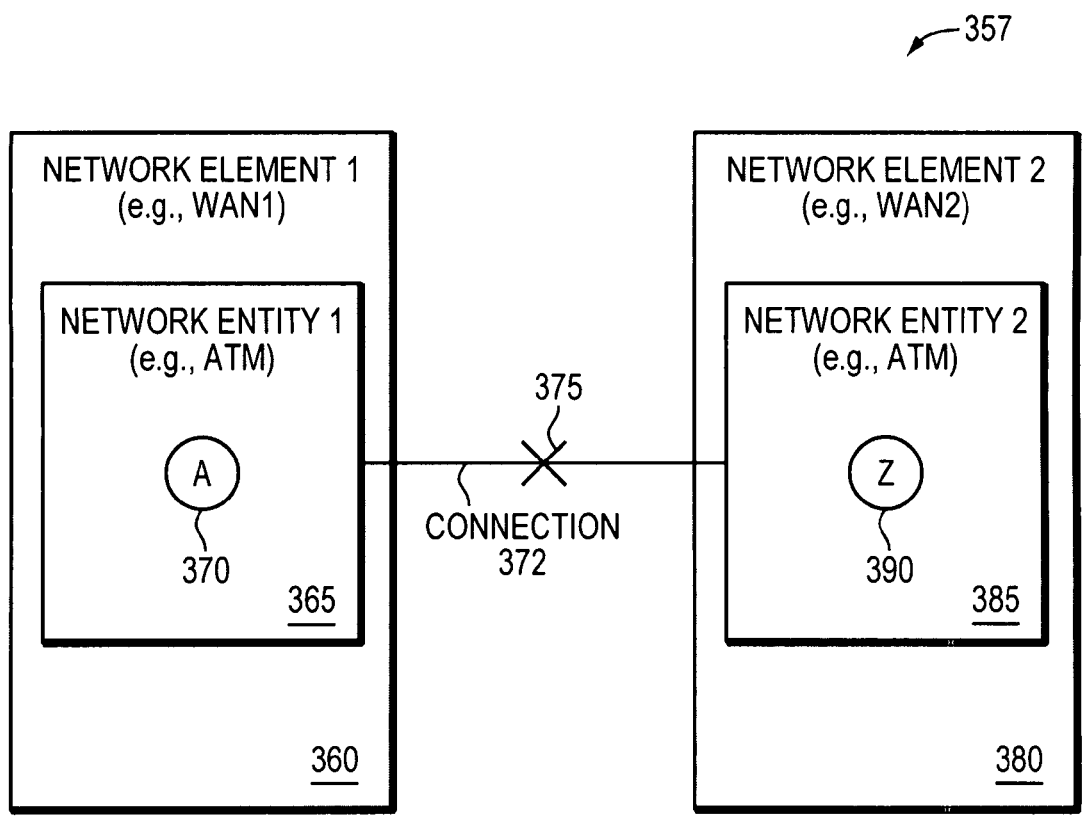

FIGS. 3A-3C are simplified partial transport service displays of a network elements, network entities, and connections according to an example embodiment of the present invention.

FIG. 3A is a simplified partial transport service display 300 of a network element 305 (e.g., a Wide Area Network (WAN)) that includes a point A 315 in a network entity 310 (e.g., Asynchronous Transfer Mode (ATM)) having a vertical connection 322 (e.g., adaption or containment) to a point Z 320. The transport service display 300 shows a fault indicator 325 on the vertical connection 322 representing a failure in the vertical connection between the point A 315 and the point Z 320. More specifically, the transport service display 300 shows a fault indicator 325 when a connection between a point in an ATM and a point a WAN has a fault. By displaying the fault indicator 325, a user can quickly identify a problem in a vertical connection or other network component in a transport service display 300.

FIG. 3B shows a simplified partial transport service display 328 of a failure in a physical or logical horizontal connection 342 between network entity 1 335 (e.g., ATM 1) and a network entity 2 350 (e.g., ATM 2). The transport service display 328 shows a fault indicator 345 in the horizontal connection 342 representing a horizontal connection failure between a point A 340 and a point Z 355 across network entities (335, 350). For example, the transport service display 328 shows a fault indicator 345 when a logical or physical horizontal connection between a point in a first ATM and a second ATM fails.

FIG. 3C is a simplified partial transport service display 357 of a failure in a physical or logical horizontal connection 372 between a network element 1 360 (e.g., WAN 1) and a network element 2 380 (e.g., WAN 2). A transport service display shows a fault indicator 375 on the horizontal connection 372 representing a horizontal connection failure between the network elements (360, 380). By viewing the display, it should be apparent that the failure occurs during a horizontal connection between a point A 370 in a network entity 1 365 and a point Z 390 in a network entity 2 385. More specifically, the transport service display 357 shows a fault indicator 375 for the horizontal connection between point A 370 and point Z 390 allowing a user to view a graphical representation of a horizontal connection problem between two WANs (e.g., the network elements (360,380)). It should be understood that the fault indicator can include annotated text or graphical information at the graphical representations. Further the transport service display 357 may also add color, remove color, create shading, remove shading, provide an audio indication, or provide other suitable representations to a user.

Figure 4:
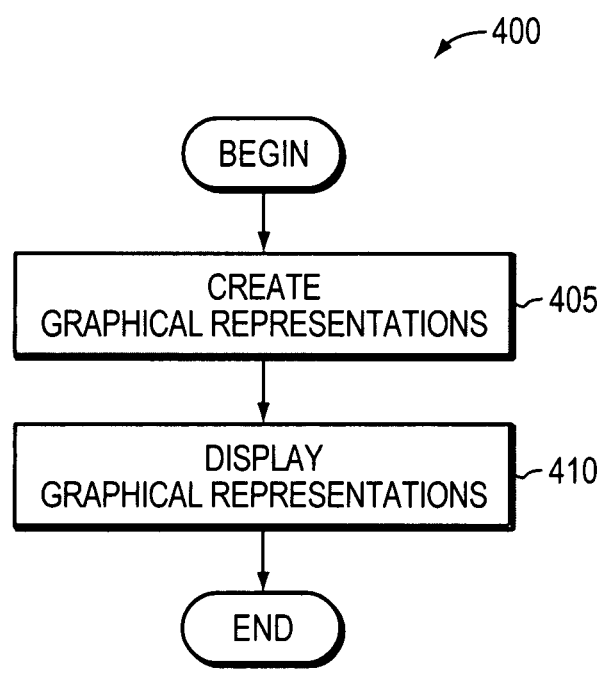
FIG. 4 is a flow diagram illustrating an example process for displaying graphical representations of a transport service according to an embodiment of the present invention.

FIG. 4 is a flow diagram 400 illustrating an example process for displaying graphical representations of a transport service according to an embodiment of the present invention. After beginning, the example process creates (405) graphical representations for a transport service. After creating the graphical representations, the example process displays (410) the graphical representations to a user, computer, or suitable output device for viewing.

Figure 5:
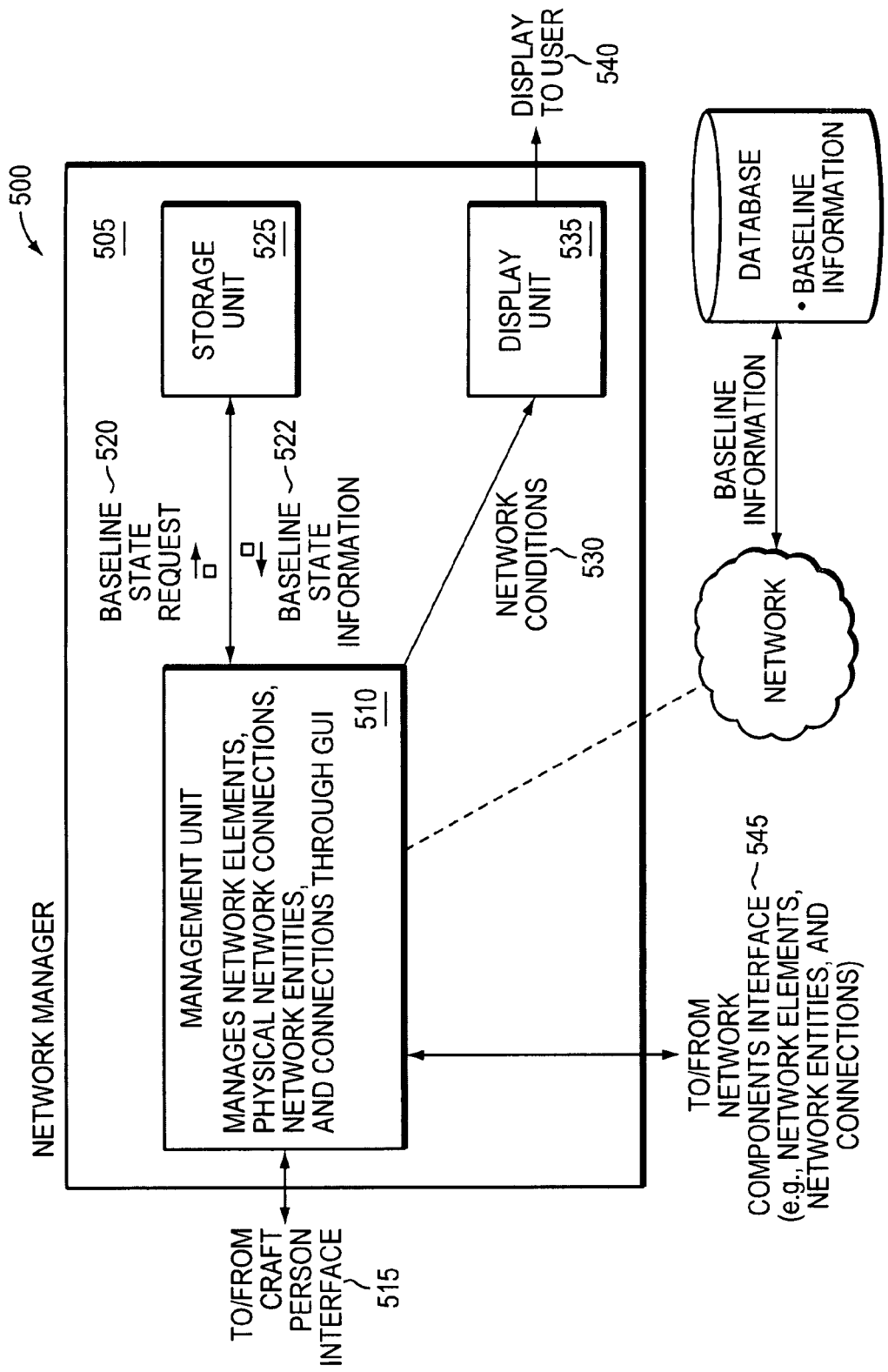
FIG. 5 is a block diagram illustrating an example network manager in accordance with an embodiment of the present invention.

FIG. 5 is a block diagram 500 illustrating an example network manager in accordance with an embodiment of the present invention. In particular, FIG. 5 shows a network manager 505 that identifies failures for one or more network component. The network manager 505 includes a management unit 510, a craft person interface 515, a network components interface 545, a storage unit 525, and a display unit 535. In this example embodiment, the management unit 510 manages network elements, physical network connections, network entities, vertical connections, and horizontal connections in a Graphics User Interface (GUI) to identify and graphically represent one or more failures.

In use, the management unit 510 makes a baseline request 520 to the storage unit 525 and receives the baseline information 522 that includes relationships for each network component in a transport service. For example, the management unit 510 receives a baseline (e.g., a relationship) for each network component. After obtaining baseline information, the management unit 510 compares the current relationship with a previous relationship. For example, if a baseline shows a difference between a previous network configuration, a graphical representation is created showing the change. That is, each difference represents a change in network conditions (e.g., a failure).

After identifying a change in the network conditions, the management unit 510 sends each network condition 530 to a display unit 535. The display unit 535 creates a display 540 and sends the display 540 to a user. The display 540 graphically represents each network component and provides highlights for each network component with change in network conditions (e.g., a failure). It is useful to note that by highlighting the network variations in each network component, a user can quickly view the display and troubleshoot the network in a substantially real-time manner. It should be understood that the display can include one or more transport services and corresponding supporting network components. Viewing one or more transport services allows a user to simultaneously identify failures in network traffic between a point A and a point Z over one or more transport services.

Figure 6A:
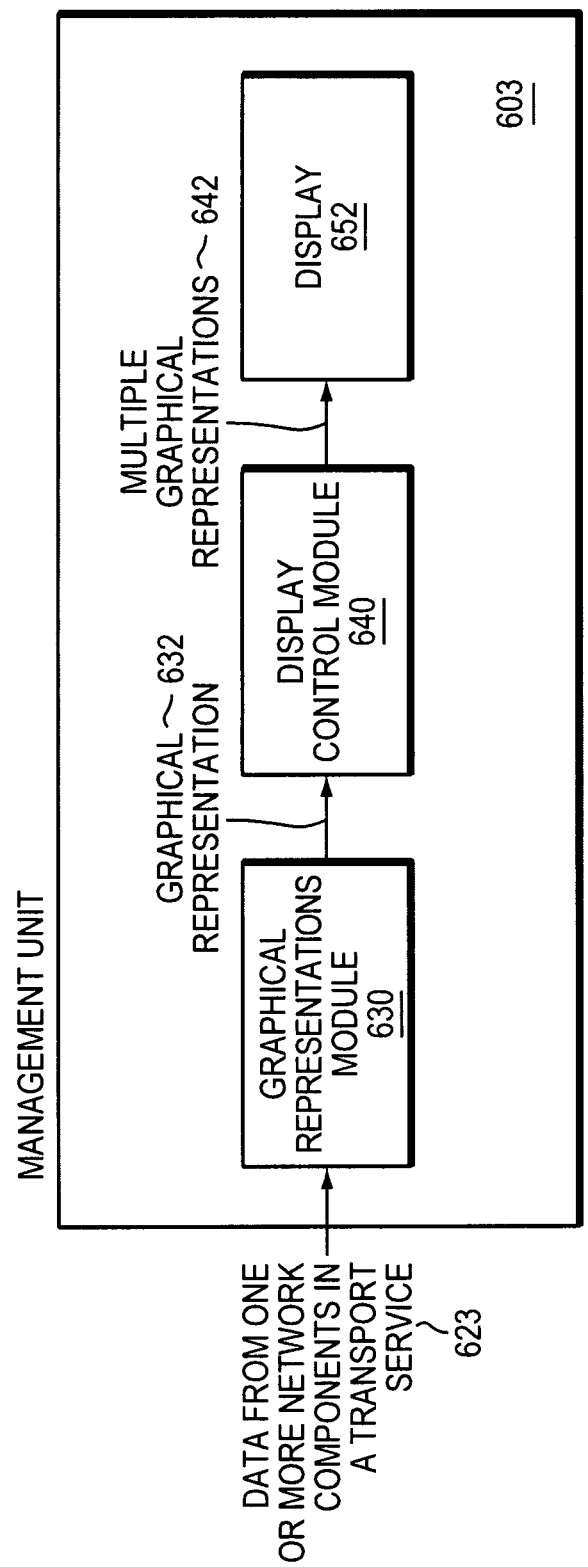
FIG. 6A is a block diagram of a management unit process data of network components to create multiple graphical representations according to embodiments of the present invention.

FIG. 6A is a block diagram of a management unit 603 process data of network components to create multiple graphical representations according to embodiments of the present invention. In particular, FIG. 6A shows a management unit 603 that includes a graphical representations module 630, a display control module 640, and a display 652. In this example embodiment, the graphical representations module 630 of the management unit 603 receives data from one or more network components in a transport service 623. After receiving the data, the graphical representations module 630 generates a graphical representation 632 and sends the graphical representation 632 for each network component to the display control module 640. The display control module 640 processes the graphical representation 632 for each network component in the transport service and sends multiple graphical representations 642 (e.g., of each network component) to the display 652. The display 652 allows a user to view graphical representations for each network component in the transport service.

Figure 6B:
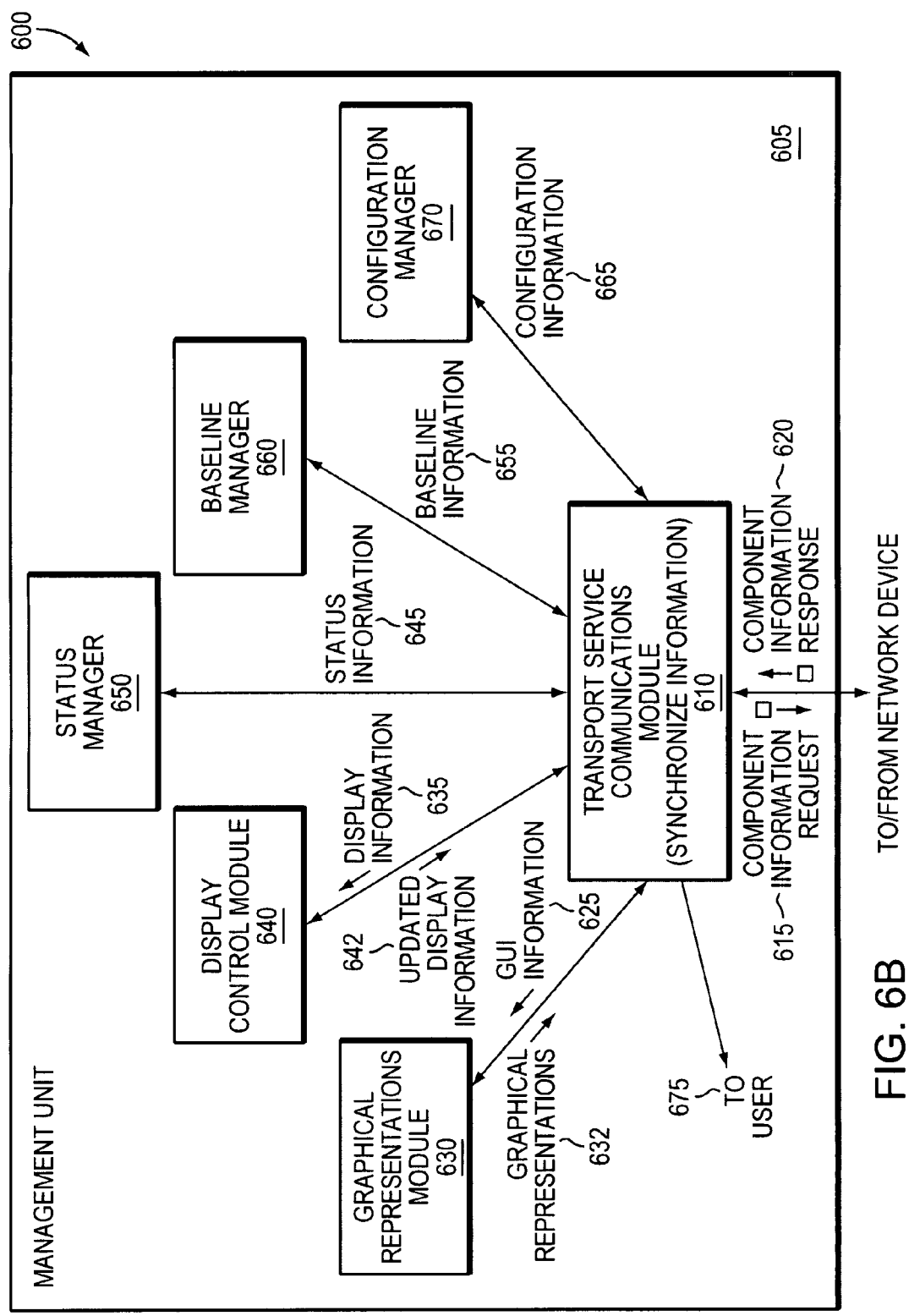
FIG. 6B is a block diagrams of a network manager synchronizing information by employing an embodiment of the present invention.

FIG. 6B is a block diagram 600 of a management unit 605 synchronizing information by employing an embodiment of the present invention. In particular, FIG. 6B shows a management unit 605 that includes a Transport Service Communications Module (TSCM) 610 (e.g., synchronizer), a graphical representations module 630, a display control module 640, a status manager 650, a baseline manager 660, and a configuration manager 670. In this example embodiment, the management unit 605 interacts with each network module or manager to synchronize data or information.

In use, the management unit 605 makes a component information request 615 to one or more network devices. The network devices reply with a component information response 620 for each network device. In turn, the TSCM 610 separates the component information response 620 into status information 645, baseline information 655, and configuration information 665. The TSCM 610 synchronizes the status information 645 with the status manager 650, the baseline information 655 with the baseline manager 660, and configuration information 665 with the configuration manager 670. Once the information is synchronized, the TSCM 610 sends the display information 635 to display control module 640 and GUI information 625 to the graphical representations module 630.

After receiving the GUI information 625, the graphical representations module 630 sends one or more graphical representations 632 to the TSCM 610. Likewise, after receiving the display information 635, the display control module 640 creates a updated display information 642, including one or more graphical representations, and returns the updated display information 642 to the TSCM 610. Next, the TSCM 610 sends (670) the updated display information including each graphical representation to a computer or user. It should be understood that the TSCM 610 is used for illustrative purposes only and the modules and managers may be placed in central modules or managers. It should be also be understood that the management unit 605 can add or remove modules and managers as appropriate.

In view of the foregoing, it should be understood that many embodiments of the present invention are possible. For example, a method or corresponding apparatus in an example embodiment of the present invention graphically represents physical network elements, network entities within the physical network elements, and connections (e.g., physical and logical connections) between the network entities to form graphical representations. Next, a method employing the embodiment simultaneously displays the graphical representations in a manner showing intra-element connections, inter-element connections, and relationships between the network entities to display a transport service from point A to point Z in the network. Further, the graphical representations can be provided to a user in a single display interface.

In an example embodiment, displaying the status of the transport service includes identifying a fault in the transport service based on information received from the physical network elements, network entities, or a network node associated with the transport service.

In yet another embodiment of the present invention, an example embodiment stores a baseline of the transport service, determines a present state of the transport service, and highlights a difference between the baseline and present states in a simultaneously display. For convenience, the highlighting may include at least a subset of the graphical representations. For further convenience, the highlighting may include presenting annotating text or graphical information at the graphical representations, adding color, removing color, creating shading and removing shading.

In still another embodiment of the present invention, an example embodiment the displaying a status of the transport service may be performed in a substantially real-time basis.

In still yet another embodiment of the present invention, an example embodiment manages the physical network connections, network entities, and connections through Graphical User Interface (GUI) interaction with the graphical representations. Further, a display may be selectively displaying expanded and collapsed parallel connections in transport service. For example, the display can show multiple transport services (e.g., expanded parallel connections) or a single transport service (collapsed parallel connections).

It should be understood that any of the processes disclosed herein, such as the graphical representations or the flow diagrams of FIG. 4, may be implemented in the form of hardware, firmware, or software. If implemented in software, the software may be processor instructions in any suitable software language and stored on any form of computer readable medium. The processor instructions are loaded and executed by a processor, such as a general purpose or application specific processor that, in turn, performs the example embodiments disclosed herein.

As describe above in reference to FIGS. 2-6, example embodiments of the present invention simultaneously display graphical representations for a transport service within a network by displaying network elements and connections between network entities to form graphical representations, where the graphical representations show intra-element connections, inter-element connections, and relationships between the network entities to display a transport service from point A to point Z in the network. In this way a user can visualize a transport service and identify faults in the transport service efficiently and on a substantially real-time basis.

Now described below in reference FIGS. 7-11, example embodiments of the present invention simultaneously present a network event representation against a transport service representation (e.g., a graphical representation of transport service within a network) to provide a visual presentation of the network event affecting the transport service in terms of the affected physical network elements, network entities, and connections.

Figure 7A:
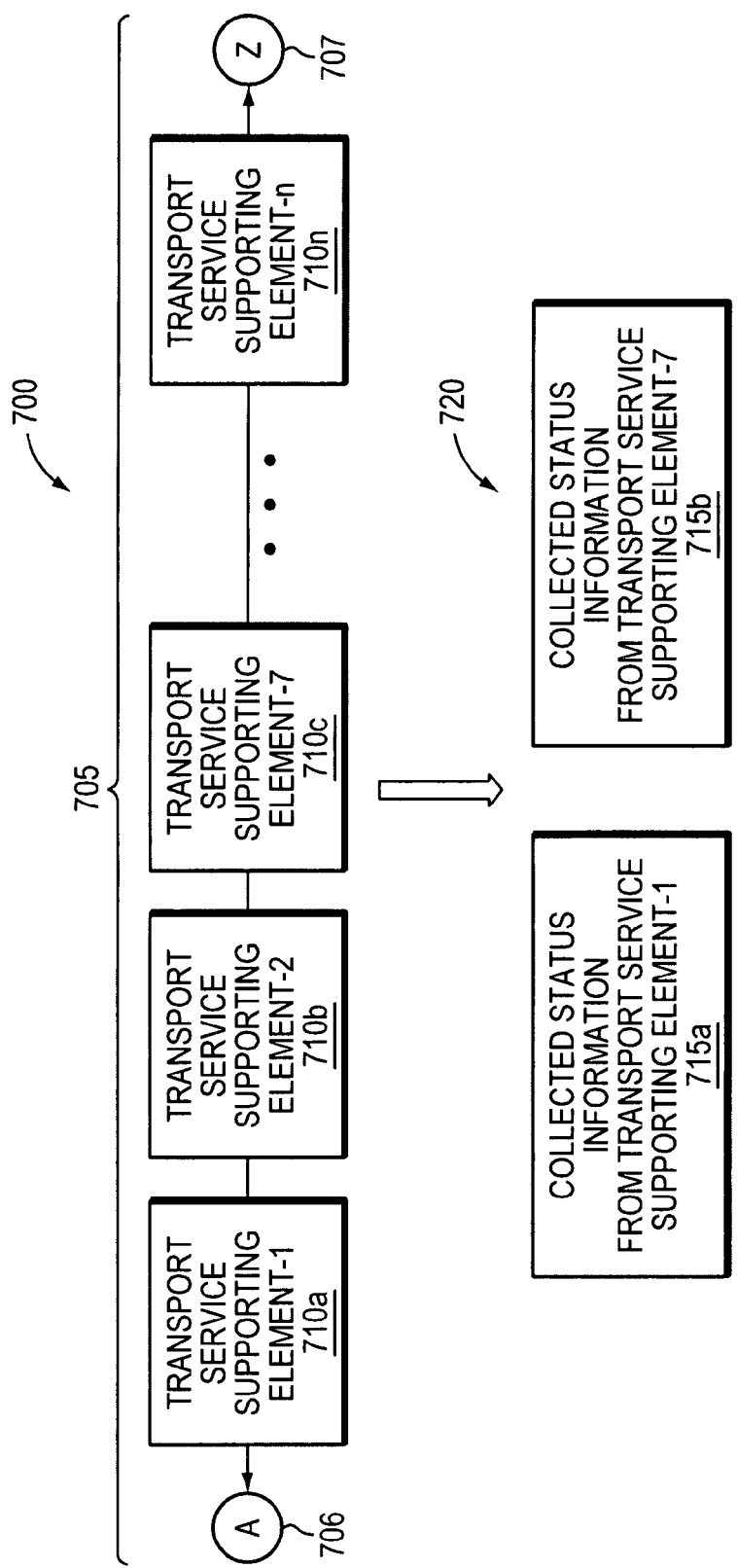
FIGS. 7A-C are block diagrams and example screenshots of example network event representations, in accordance with embodiments of the present invention.

In FIG. 7A, an example transport service representation 700 represents a transport service 705 between a point A 706 and a point Z 707 in terms of a first transport service supporting element through an nth transport service supporting element (710a . . . 710n, generally 710a-n). As described in reference to FIG. 2, the transport service supporting elements 710a-n includes network elements (e.g., the network elements 220), entities (e.g., the entities 225), and connections (e.g., the connections 230).

In the example illustrated in FIG. 7A, one embodiment collects from a portion of the transport service supporting elements 710a-n, status information 715a and 715b. The collected status information 715a, 715b indicates network event(s) affecting transport service. Based on the collected information 715a, 715b a representation 720 represents the network event(s) affecting transport service.

The collected status information 715a, 715b may be actively collected, for example, using a request message to request for the status information 715a, 715b and a response message to respond with the status information 715a, 715b. Alternatively, the collected status information 715a, 715b may be passively collected, for example, an update message may provide the status information 71 5a, 715b periodically or resulting from a triggering event. However, one of ordinary skill in the art will readily recognize the act of collecting the status information 715a, 715b to form the network event representation 720 is of greater significance than whether a mechanism for collecting the status information 715a, 715b is active or passive. As such, despite a possible inference of embodiments of the present invention collecting status information actively, principles of the present invention are not intended to be limited by such an inference.

Figure 7B:
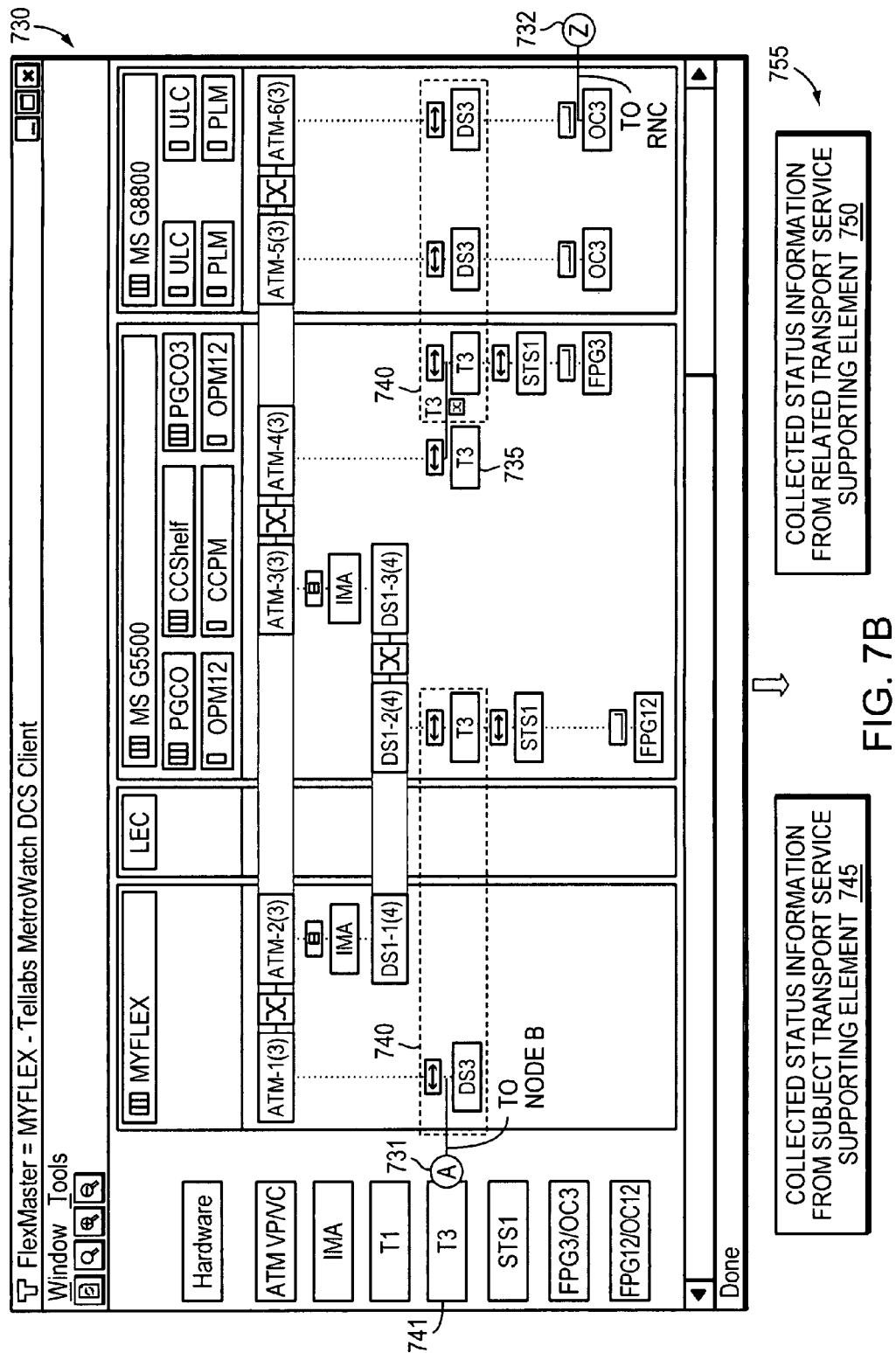

In FIG. 7B, an alternative embodiment collects from a subject transport service supporting element 735 and related transport service supporting elements 740, state information (745 and 750, respectively). The collected status information 745 and 750 indicate of a network event affecting both the subject and the related transport service supporting elements 735 and 740.

A transport service representation 730 represents an example transport service between a point A 731 and a point Z 732 in a network. The transport service representation 730 organizes the subject transport service supporting element 735 and the related transport service supporting elements 740 into a same network level 741. The related transport service supporting elements 740 are denoted in FIG. 7C, as described in detail below, by a dotted and dashed outline 780.

A relationship exists between transport service supporting elements at a same network level (i.e., transport service supporting elements on a same network level are related). Transport service supporting elements may also be related on different network levels (e.g., one network layer above or below another network layer).

Because a relationship exists between a subject supporting element and related transport service supporting elements, often a network event directly affecting the subject transport service supporting element also affects the related transport service supporting elements indirectly (i.e., the network event has an indirect effect). As such, status information collected from related transport service supporting elements may be useful for correlating a network event affecting a transport service with the transport service affected by the network event. In this way the aforementioned embodiment does not, or may at controlled levels, suppress indirect indications from related transport service supporting elements which indicate a network event affecting transport service.

Continuing to refer to FIG. 7B, based on the collected status information 745 and 750, a representation 755 represents the network event affecting both the subject transport service supporting element 735 and the related transport service elements 740.

Figure 7C:
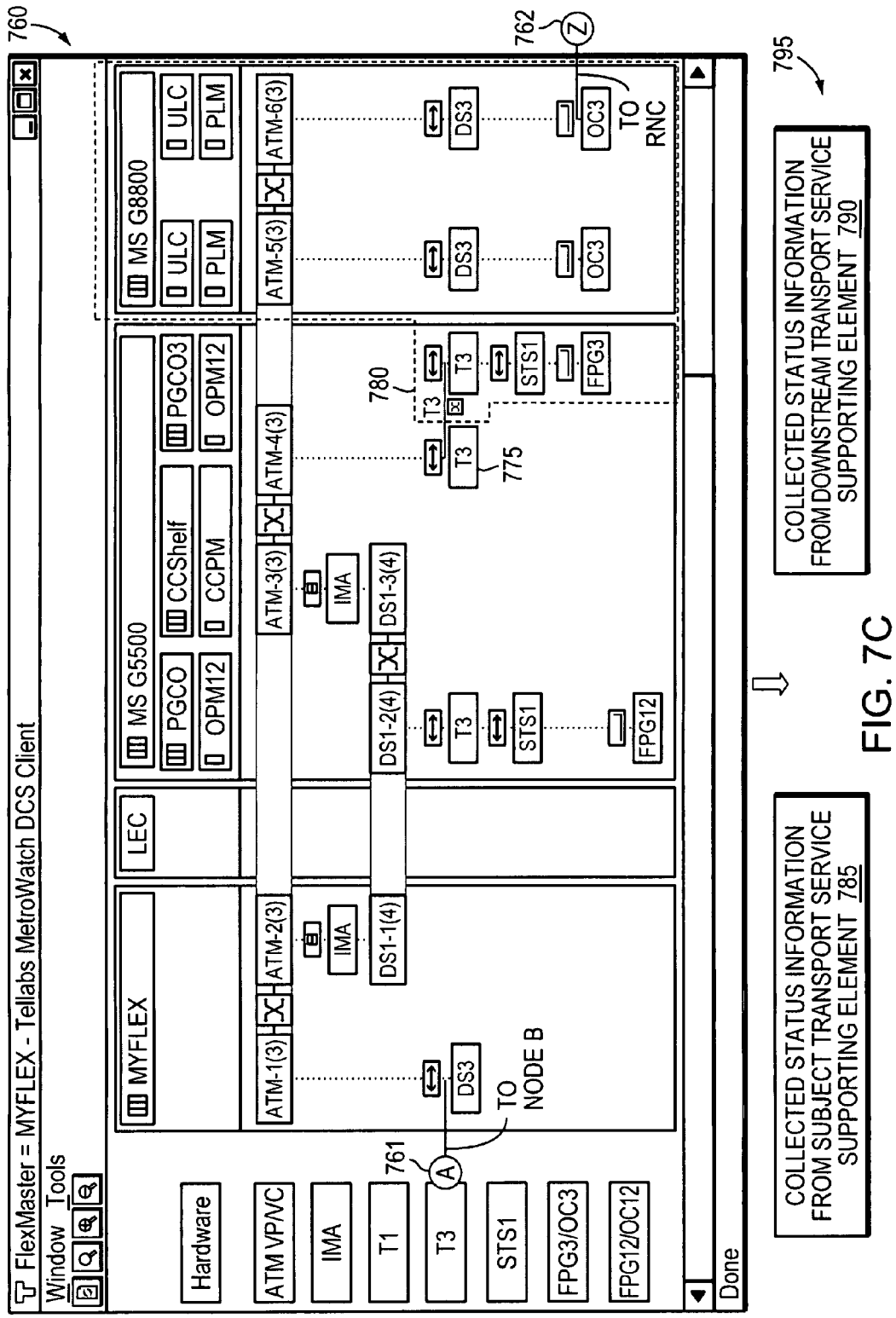

FIG. 7C is a screen shot illustrating an alternative embodiment that collects, from a subject transport service supporting element 775 and downstream supporting elements 780, status information 785 and 790, respectively. The collected status information 785 and 790 indicate a network event affecting both the subject and the downstream supporting elements 775 and 780, respectively.

A transport service representation 760 represents an example transport service between a point A 761 and a point Z 762 traversing the subject supporting element 775 and the downstream supporting elements 780. The downstream supporting elements 780 are denoted in FIG. 7C by a dotted and dashed outline 780.

A network event affecting a subject transport service supporting element often affects the transport service downstream supporting elements (i.e., the network event has a downstream effect). As such, status information collected from downstream supporting elements may be useful for correlating a network event affecting a transport service with the transport service affected by the network event. In this way the aforementioned embodiment does not suppress downstream, indications from downstream transport service supporting elements which indicate a network event affecting transport service.

Continuing to refer to FIG. 7C, based on the collected status information 785 and 790, a representation 795 represents the network event affecting both the subject transport service supporting element 775 and the transport service downstream elements 780.

The embodiments illustrated in and described in reference to FIGS. 7A-C are contrasted with reducing a number of indications or alarms as generally done in the prior art. In prior art systems involving reducing the number of alarms (often to a single alarm), invariably require complex network information modeling and coding logic to achieve alarm reduction. However, even with the number of alarms reduced, a user, such as a network administrator, is still required to spend time and "drill down" to identify the correct transport service supporting element to begin troubleshooting and resolving a network fault. Reducing the number of alarms presented to the user, for example, by suppressing alarms from related or downstream supporting elements does not necessarily result in less time spent troubleshooting or resolving a network event affecting transport service.

Here, to troubleshoot and analyze a network event, at least some example embodiments, contrary to simply presenting fewer alarms, present a highly structured and comprehensive visual presentation depicting a network event affecting a transport service in terms of the transport service supporting elements affected by the network event. Even in embodiments (described in reference to FIG. 11) which may "reduce" the number of alarms presented, such embodiments still provide a highly structured and comprehensive visual presentation. In either instance, the provided visual presentation enables a viewer to correlate in a visual manner the network event affecting the transport service with the transport service affected by the network event directly.

Figure 8A:
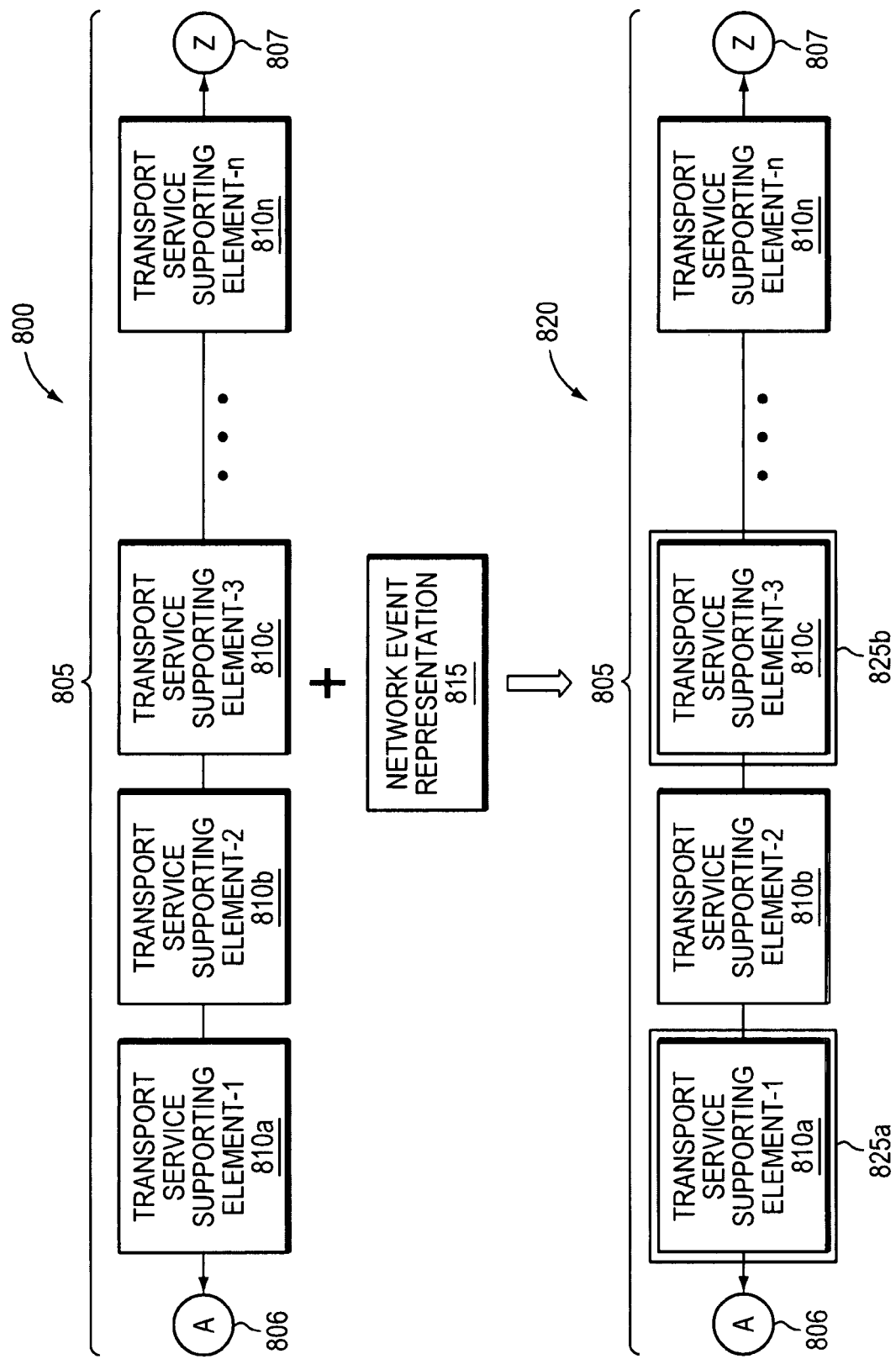
FIG. 8A is block diagram of an example visual presentation, in accordance with an embodiment of the present invention.
Figure 8B:
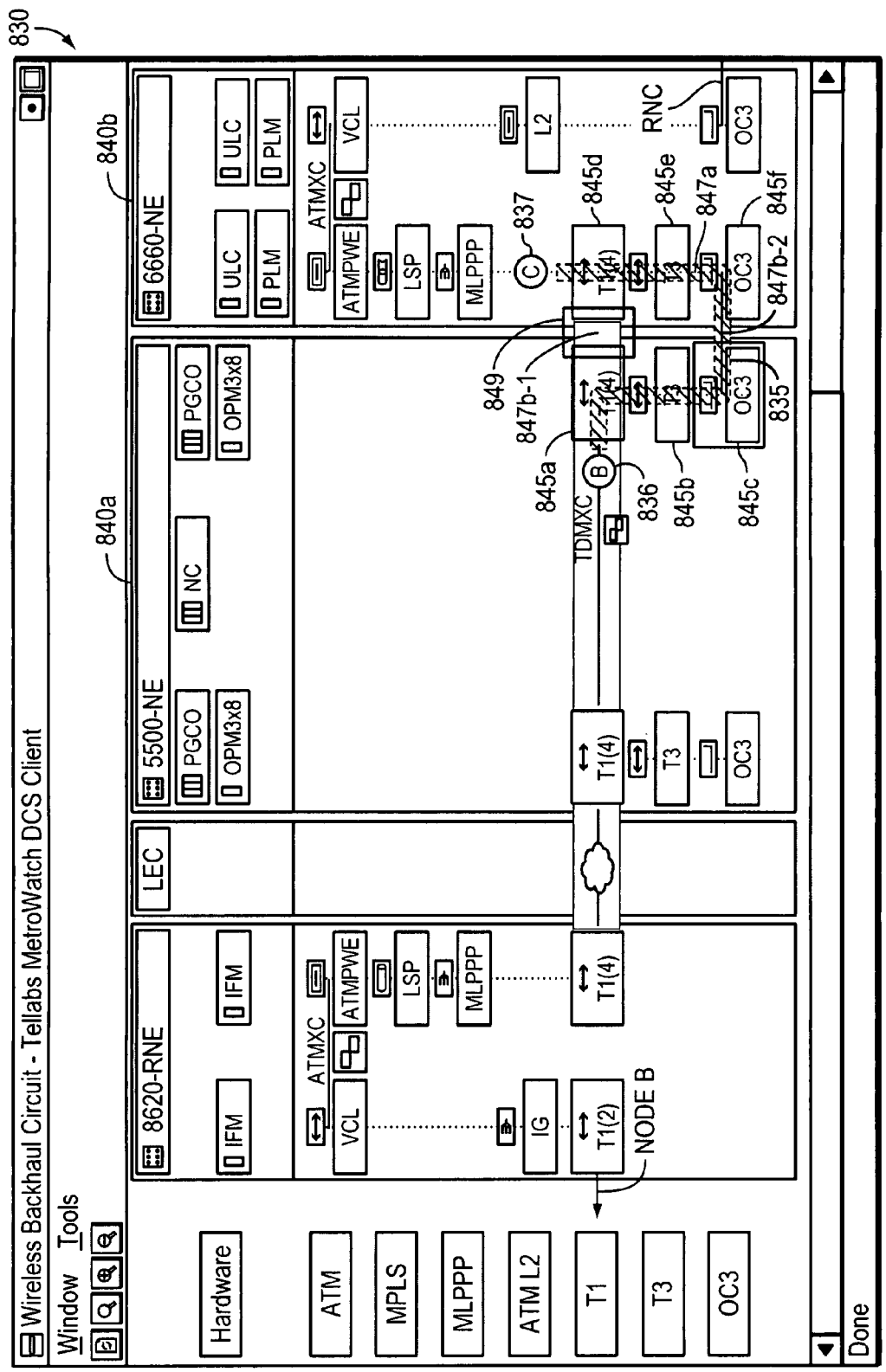
FIG. 8B and 8C are block diagrams comparing troubleshooting and analyzing with an example visual presentation, in accordance with an embodiment of the present invention, and a typical presentation.
Figure 8C:
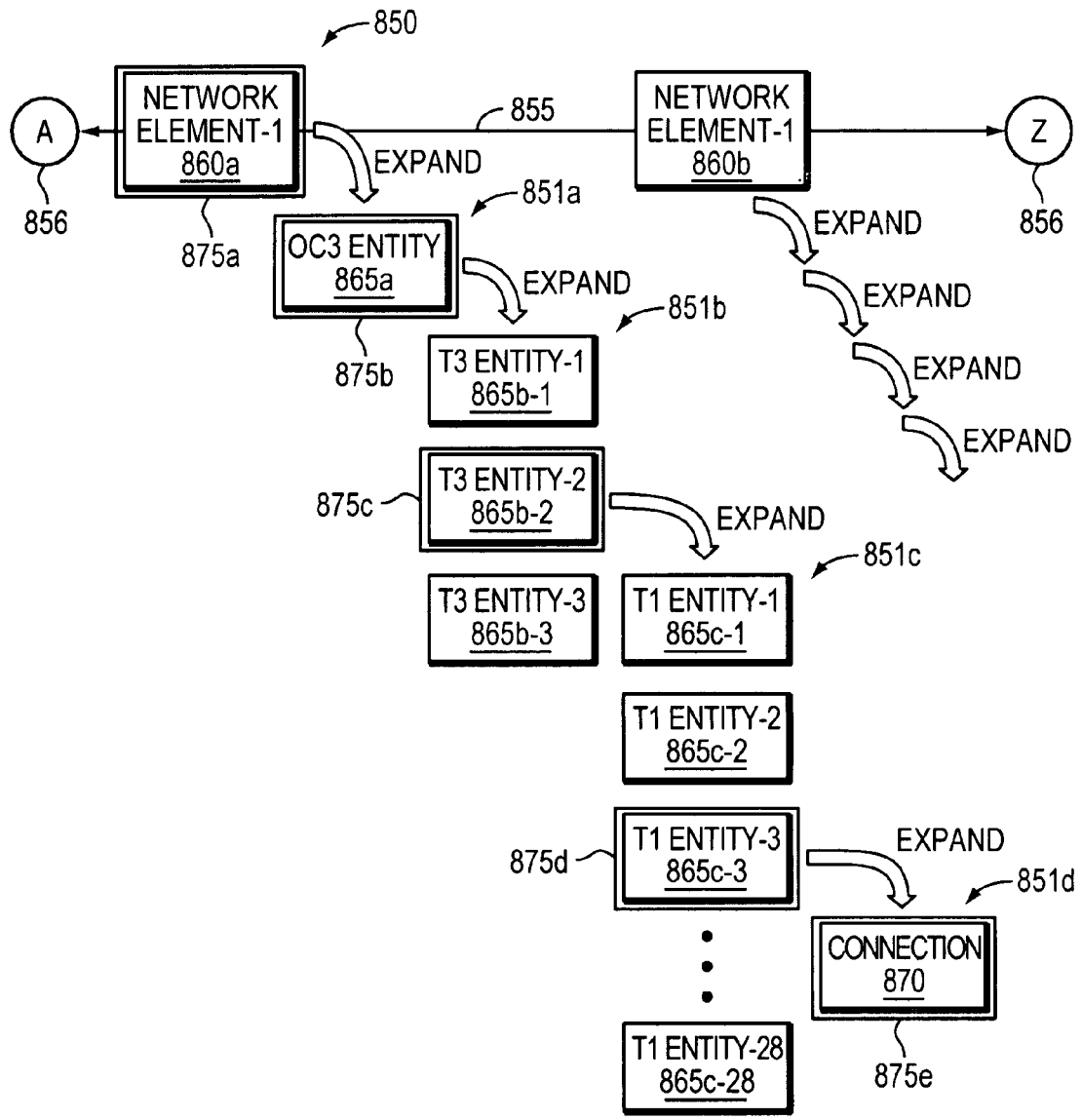

To illustrate, consider a comparison between troubleshooting and analyzing a network event affecting a transport service between two points in a network using a visual presentation according to embodiments of the present invention illustrated in FIG. 8B and a typical presentation illustrated in FIG. 8C. But before the comparison, consider an example illustrated in FIG. 8A generally applying principles of the present invention.

In FIG. 8A, an example transport service representation 800 represents a transport service 805 between a point A 806 and a point Z 807 in terms of a first transport service supporting element through an nth transport service supporting element (810a . . . 810n, generally 810a-n). As described in reference to FIG. 2, the transport service supporting elements 810a-n includes network elements (e.g., the network elements 220), entities (e.g., the network entities 225), and connections (e.g., the connections 230).

Also in FIG. 8A, a network event representation 815 represents a network event affecting the transport service 805.

A visual presentation 825 simultaneously presents the network event representation 815 against the transport service representation 800. Because the transport service representation 800 represents the transport service 805 in terms of transport service supporting elements 810a-n while the network event representation 815 represents the network event affecting the transport service 805, simultaneously presenting the representations 800 and 815, one against another, the resulting visual presentation 820 presents the network event affecting the transport service 805 in terms of the affected transport service supporting elements 810a-n (namely, the affected physical network elements, network entities, and connections). The provided visual presentation 820 enables a viewer to correlate visually the network event, affecting the transport service 805, with the transport service 805, affected by the network event.

Additionally, in the example embodiment illustrated in FIG. 8A, indicator boxes 825a and 825b, generally 825 indicate the network event affecting the first and third transport service supporting elements 810a and 810c. The indicator boxes 825 provide a visual cue of the transport service affected by the network event. One of ordinary skill in the art will readily recognize that the indicator box 825 may take any form or format, such as highlights, flashing graphics, color changes, or other visual cues.

However, contrary to the indicator boxes 825, it is useful to note that the first and third transport service supporting elements 810a and 810c are not necessarily both affected by the network event directly. In one case, the first transport service supporting element 810a-na may be affected by the network event directly (i.e., a subject transport service supporting element) and the third supporting element 810c may be affected by the network event indirectly, or vice versa.

In such cases, the embodiment illustrated in FIG. 8A indicates at least a portion of the transport service supporting elements 810a-n affected by the network event, thereby providing a visual cue of the network event affecting the portion of the transport service supporting elements 810a-n. In this way a viewer sees the network event affecting the transport service in terms of the affected portion of the transport service supporting elements as contrasted with, in this example embodiment, seeing only a reduced number of alarms. Consequently, the viewer is able to correlate visually the network event affecting the transport service, with the transport service affected by the network event.

An alternative embodiment (not shown) indicates a subject transport service supporting element and transport service supporting elements related to the subject transport service supporting element affected by the network event. By doing so, the embodiment provides a visual cue of the network event affecting both the subject and the related transport service supporting elements. In this way, a viewer sees the network event affecting the transport service in terms of the affected subject and related transport service supporting elements as contrasted with, in this example embodiment, seeing only a reduced number of alarms.

Another alternative embodiment (not shown) indicates a subject transport service supporting element and transport service supporting elements downstream of the subject transport service supporting element affected by a network event. By doing so, the embodiment provides a visual cue of the network event affecting both the subject and the downstream transport service supporting elements. In this way a viewer sees the network event affecting the transport service in terms of the affected subject and downstream transport service supporting elements as contrasted with, in this example embodiment, seeing only a reduced number of alarms.

FIG. 8B is a visual presentation 830 that visually presents a transport service 835 between a point B 836 and a point C 837 in terms of elements 840, 845 and 847 supporting the transport service 835. Included are a first network element 840a and a second network element 840b (e.g., TELLABS 5500 TRANSPORT SWITCH and TELLABS 8860 MULTI-SERVICE ROUTER). The first network element 840a includes, among other things, a T1 network entity 845a, a T3 network entity 845b, and an OC3 network entity 845c, generally 845.

The network entities 845 are connected by vertical connections 847a and horizontal connections 847b. The vertical connections 847a represent adaptions from one network entity into another (e.g., from the T1 entity 845a into the T3 entity 845b). In illustrated example, the T1 entity 845a is multiplexed (or otherwise adapted) with other T1 entities (not shown) into the T3 entity 845b. The T3 entity 845b is further multiplexed with other T3 entities (not shown) into the OC3 entity 845c.

The horizontal connectors 847b represent "logical links" (e.g., a logical link 847b-1) and "physical links" (e.g., a physical link 847b-2) between "peer" network entities. The physical link 847b-2 connects peer entities with a physical media. In the illustrated example, the physical link 847b-2 represents a fiber optic connection between peer entities. The physical link 847b-2 is not limited to fiber, but may connect peer entities with, for example, copper, wireless or other physical media.

The logical link 847b-1 connects peer entities, not physically, but logically. For example, a first peer originates a communication (e.g., data, signaling, etc.) per a protocol and a second peer terminates the communication per the protocol. Because the first and second peers communicate to each per the protocol, there is a logical connection (i.e. relationship) between the first and second peers, which is represented by the logical link 847b-1.

The second network element 840b includes T1, T3, OC3 network entities 845d-f, which are connected to one another by the vertical connections 847a and horizontal connections 847b. The logical link 847b-1 logically connects the T1 entities 845a and 845d. The physical link 847b-2 physically connects the OC3 entities 845c and 845f.

In the example illustrated in FIG. 8B, the logical link 847b-1 between the T1 entities 845a and 845d is set-off visually by an indicator box 849. The indicator box indicates that the logical link 847b-1 is affected by the network event. In this way the visual presentation 830 visually presents the network event affecting the transport service 835 between the point B 836 and the point C 837 in terms of the logical link 847b-1 between the T1 entities 845a and 845d affected by the network event.

In FIG. 8C, a typical presentation 850 presents a network event affecting a transport service 855 between a point B 856 and a point C 857 in terms of a first network element 860a and a second network element 860b being affected by the network event. An indication box 875a indicates the network event affecting the first network element 860a. Recall, however, a network element includes network entities within the network element and connections between the network entities. As such, it is not clear from the indication box 875a whether the first network element 860a or the network entities within the first network element 860a are affected by the network event. Further troubleshooting and analysis is supported by allowing an operator to expand the presentation 850 into a first expanded presentation 851a.

The first expanded presentation 851a presents an OC3 entity 865a affected by the network event. An indication box 875b indicates the network event affecting the OC3 entity 865a. However, as described previously, there is a connection (adaption between an OC3 entity and a T3 entity, namely, multiple T3 entities (specifically three) are multiplexed to a single OC3 entity. As such, it is not clear from the indication box 875b whether the OC3 entity 865a or one of the multiplexed T3 entities is affected by the network event. Accordingly, further troubleshooting and analysis is supported by enabling expanding the first expanded presentation 851a into a second expanded presentation 851b.

The second expanded presentation 851b expands the OC3 entity 865a into a first, second, and third T3 entities 865b-1, 2, and 3 (generally 865b) because an OC3 entity multiplexes three T3 entities. Moreover, the second expanded presentation 851b presents one of three T3 entities 865b affected by the network event. An indication box 875c indicates the network event affecting the second T3 entity 865b-2. However, because there is a connection (adaption) between a T3 entity and a T1 entity, namely, multiple T1s (specifically 28), are multiplexed into a single T3 entity, it is not clear from the indication box 875c whether the network event affects the second T3 entity 865b-2 or a T1 entity multiplexed by the second T3 entity 865b-2. Accordingly, further troubleshooting and analysis is supported by enabling expanding the second expanded presentation 851b into a third expanded presentation 851c.

The third expanded presentation 851c expands the second T3 entity 865b-2 into a first through twenty-eighth T1 entities 865c-1 ... 28 (generally 865c) because a T3 entity multiplexes twenty-eight T1 entities. Moreover, the third expanded presentation 851c presents one of the twenty eight T1 entities 865c as being affected by the network event. An indication box 875d indicates the network event affecting the third T1 entity 865c-3.

However, because there is a connection (logical link) between T1 peer entities, it is not clear from the indication box 875d whether the network event affects the third T1 entity 865c-3 or a connection between it and its peer. Accordingly, further troubleshooting and analysis is supported by enabling expanding the third expanded presentation 851c into a fourth expanded presentation 851d.

The fourth expanded presentation 851d expands the third T1 entity 865c-3 into a connection 870 between the third T1 entity 865c-3 and its peer. Moreover, the fourth expanded presentation 851d presents the connection 870 as being affected by the network event. An indication box 875e indicates the network event affecting the connection 870.

As illustrated, presenting the network event affecting the transport service 855 in terms of the connection 870 between the third T1 entity 865c-3 and its peer requires a series of presentation and expanded presentations 850 and 851a-d. A similar series of presentation and expanded presentations may be required beginning with a presentation of the network event affecting the second network element 860b.

Each presentation (850 and 851a-d) enables an operator to expand or otherwise "drill down" from a previous presentation. Consequently, additional steps (and time) are required for troubleshooting and analyzing a network event affecting a transport service.

Even if a presentation were to present, using complex information models and coding logic, a reduced number of transport service supporting elements affected by a network event, such a presentation still requires expanding. Each presentation presents the network event affecting a transport service in terms of a transport service supporting element separate and in isolation of other elements supporting the transport service (e.g., downstream and related transport service supporting elements described in reference to FIGS. 7A-C). A network event affecting a connection between network entities may be presented in a presentation which presents a network event affecting a transport service in terms of connection between entities, but not in presentations which present the network event affecting the transport service in terms of either the network element or the network entities.

Figure 9A:
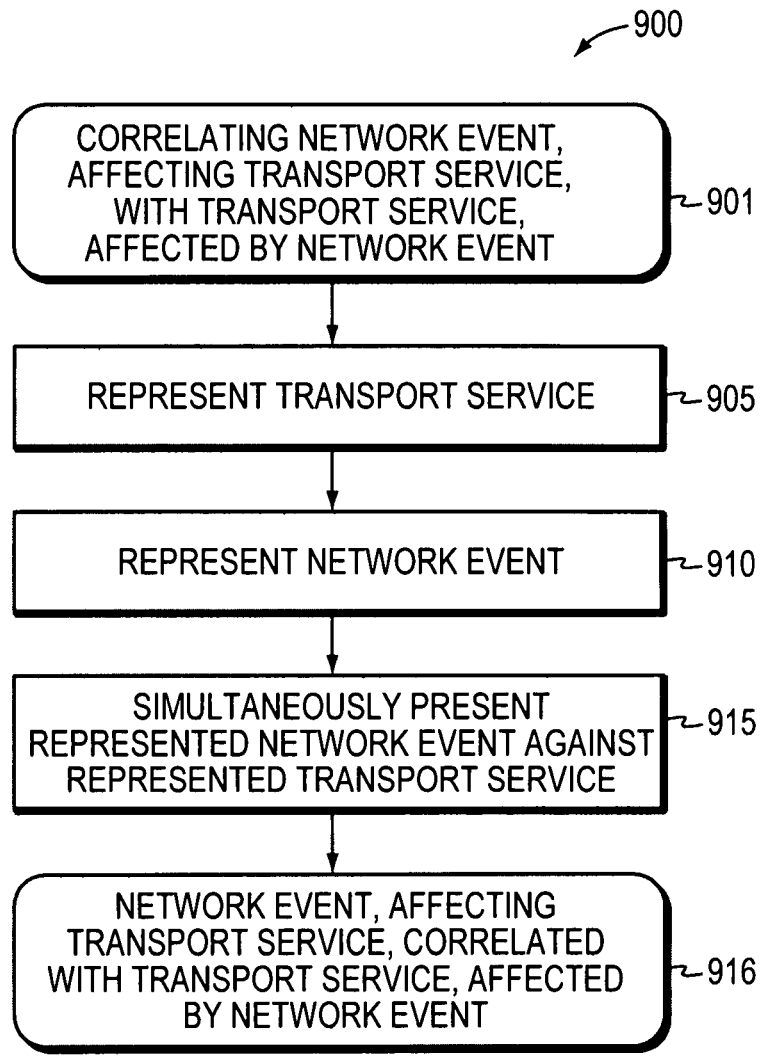
FIGS. 9A and 9B are flow diagrams of example processes for correlating in a visual manner a network event affecting a transport service with the transport service affected by the network event, in accordance with embodiments of the present invention.

In FIG. 9A, an example process 900 visually correlates a network event affecting a transport service with the transport service affected by the network event. The process 900 starts (901) visually correlating a network event with a transport service. The transport service is between a point A and a point Z in a network. The process 900 represents (905) the transport service in terms of physical network elements, network entities within the physical network elements, and connections between the network entities to form a representation of the transport service. The formed transport service representation shows connections within a network element (intra-network element connections), connections between network elements (inter-network element connections), and relationships between the network entities.

The process 900 represents (910) a network event affecting the transport service to a form a representation of the network event.

The process 900 simultaneously presents (915) the network event representation against the transport service representation to provide a presentation of the network event affecting the transport service in terms of the physical network elements, the network entities, and the connections affected. The provided presentation enables a viewer to visually correlate the network event, affecting the transport service, with the transport service, affected by the network event.

The process 900 ends (916) with the network event visually correlated with the transport service.

Figure 9B:
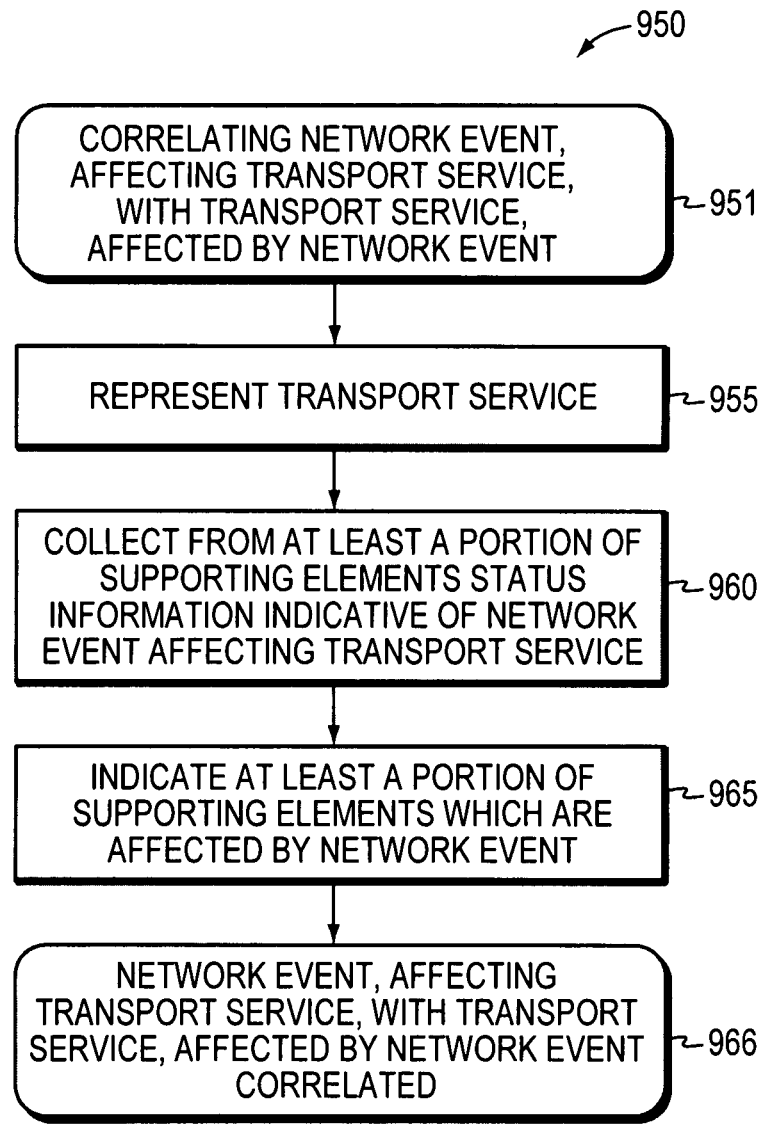

In FIG. 9B, another example process 950 visually correlates a network event affecting a transport service with the transport service affected by the network event. The process 950 starts (951) visually correlating a network event with a transport service. The transport service is between a point A and a point Z in a network. The process 950 represents (955) the transport service in terms of physical network elements, network entities within the physical network elements, and connections between the network entities to form a representation of the transport service. The formed representation shows connections within a network element (intra-network element connections), connections between network elements (inter-network element connections), and relationships between the network entities.

The process 950 collects (960) from at least a portion of the physical network elements, network entities, and connections (i.e., transport service supporting elements), status information indicative of the network event affecting the transport service. The collected information represents the network event affecting the transport service.

In an alternative embodiment, the process 950 collects (not shown) from a subject transport service supporting element and transport service supporting elements related to the subject transport service supporting element, status information indicative of a network event affecting both the subject and the related transport service supporting elements. As such, the collected information represents the network event affecting the transport service in terms of both the subject transport service supporting element and the related transport service supporting elements.

In another alternative embodiment, the process 950 collects (not shown) from a subject transport service supporting element and transport service supporting elements downstream of the subject transport service supporting element, status information indicative of a network event affecting both the subject and the downstream transport service supporting elements. As such, the collected information represents the network event affecting the transport service in terms of both the subject transport service supporting element and the downstream transport service supporting elements.

Continuing with FIG. 9B, the process 950 indicates (965) at least a portion of the transport service supporting elements which are affected by the network event. The indicated transport service supporting elements provides a visual cue of the transport service affected by the network event.

In an alternative embodiment, the process 950 indicates (not shown) a subject transport service supporting element and transport service supporting elements related to the subject transport service supporting element which are affected by the network event. As such, the indicated subject and related transport service supporting elements provide a visual cue of the transport service affected by the network event, in terms of the subject and the related transport service supporting elements.

In another alternative embodiment, the process 950 indicates (not shown) a subject transport service supporting element and transport service supporting elements downstream of the subject transport service supporting element which are affected by the network event. As such, the indicated subject and downstream transport service supporting elements provide a visual cue of the transport service affected by the network event, in terms of the subject and the downstream transport service supporting elements.

The process 950 ends (966) with the network event visually correlated with the transport service.

Figure 10A:
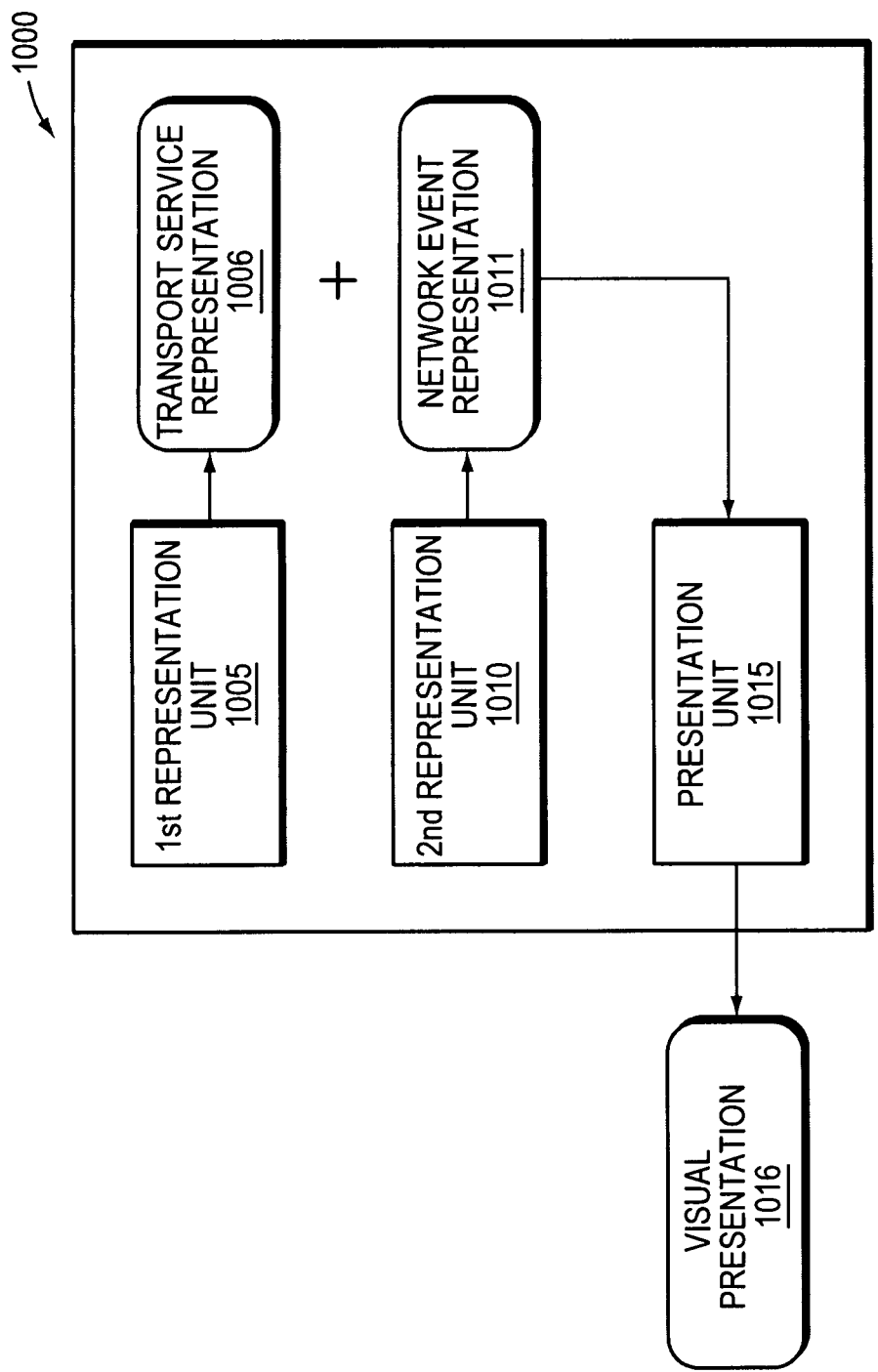
FIGS. 10A-C are block diagrams of an example apparatus to correlate in a visual manner a network event affecting a transport service with the transport service affected by the network event, in accordance with embodiments of the present invention.

In FIG. 10A, an example apparatus 1000 visually correlates a network event affecting a transport service with the transport service affected by the network event. The apparatus 1000 includes a first representation unit 1005 to represent a transport service between point A and point Z in a network in terms of physical network elements, network entities within the physical network elements, and connections between the network entities and to form a representation of the transport service 1006. The formed transport service representation 1006 shows intra-network element connections, inter-network element connections, and relationships between the network entities.

The apparatus 1000 also includes a second representation unit 1010 to represent a network event affecting the transport service to form a representation of the network event 1011.

The apparatus 1000 further includes a presentation unit 1015 coupled to the first representation unit 1005 and the second representation unit 1010 to simultaneously present the network event representation 1011 against the transport service representation 1006 to provide a visual presentation 1016 of the network event affecting the transport service in terms of the affected physical network elements, the network entities, and the connections. The provided visual presentation 1016 enables a viewer to visually correlate the network event affecting the transport service, with the transport service affected by the network event.

Elements of the example apparatus 1000, namely, the first representation unit 1005, the second representation unit 1010, and the presentation unit 1015, may be co-located, as illustrated in FIG. 10A. For example, they may be co-located in the Status Manager 650 of FIG. 6. Alternatively, these elements may be distributed amongst the various managers and modules described in reference to FIG. 6.

Figure 10B:
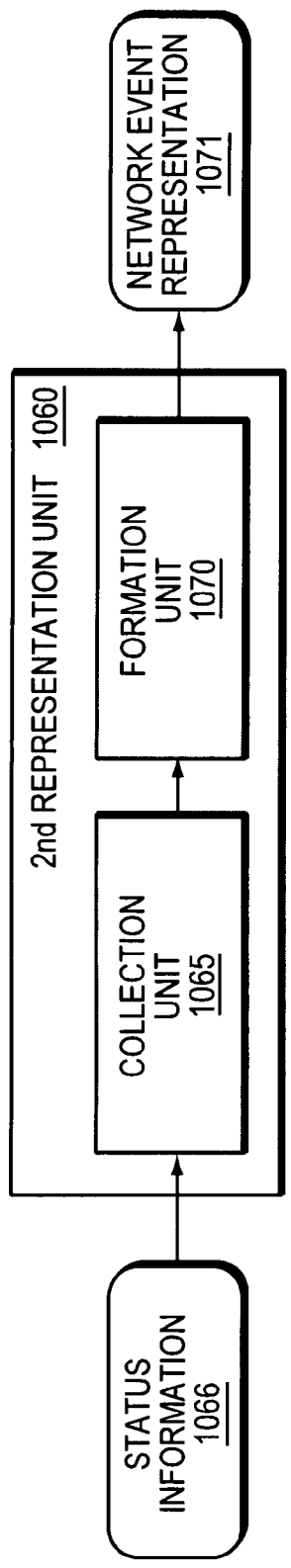

Whether co-located in a single entity or distributed amongst several entities, in an embodiment illustrated in FIG. 10B, a second representation unit 1060 (e.g., the second representation unit 1010 of FIG. 10A) includes a collection unit 1065 made to collect from at least a portion of the transport service supporting elements, status information 1066 indicative of the network event affecting the transport service.

The second representation unit 1060 also includes a formation unit 1070 coupled to the collection unit 1065 made to form, based on the collected information 1066, a representation 1071 of the network event affecting the transport service.

In an alternative embodiment (not shown), a collection unit is made to collect from a subject transport service supporting element and transport service supporting elements related to the subject transport service supporting element, status information indicative of the network event affecting both the subject and the related transport service supporting elements.

In another alternative embodiment (not shown), a collection unit is made to collect from a subject transport service supporting element and transport service supporting elements downstream of the subject transport service supporting element, status information indicative of the network event affecting both the subject and the downstream transport service supporting elements.

Figure 10C:
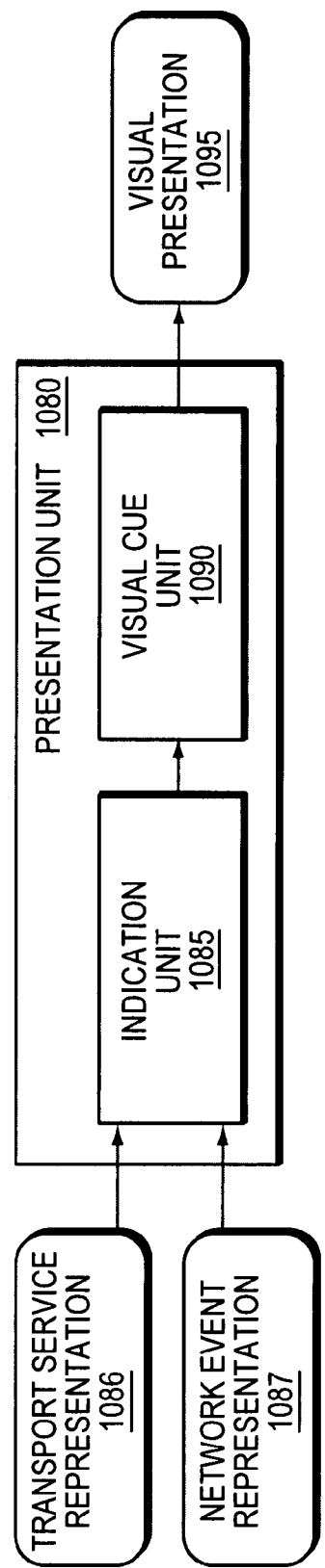

Whether co-located in a single entity or distributed amongst several entities, in an embodiment illustrated in FIG. 10C, a presentation unit 1080 (e.g., the presentation unit 1015 of FIG. 10A) includes an indication unit 1085 made to indicate at least a portion of the transport service supporting elements affected by the network event. In particular, the indication unit 1085 accepts (or otherwise process) a transport service representation 1086 and a network event representation 1087.

The presentation unit 1080 also includes a visual cue unit 1090 coupled to the presentation unit 1080 made to provide a visual cue (or presentation) 1095 of the network event affecting the transport service in terms of the affected portion of the transport service supporting elements.

In an alternative embodiment (not shown), an indication unit is made to indicate a subject transport service supporting element and transport service supporting elements related to the subject transport service supporting element affected by the network event. Additionally, in this embodiment, a visual cue unit is made to provide a visual cue of the network event affecting the transport service in terms of both the affected subject and related transport service supporting elements.

In an alternative embodiment (not shown), an indication unit is made to indicate a subject transport service supporting element and transport service supporting elements downstream of the subject transport service supporting element affected by the network event. Additionally, in this embodiment, a visual cue unit is made to provide a visual cue of the network event affecting the transport service in terms of both the affected subject and downstream transport service supporting elements.

Figure 11:
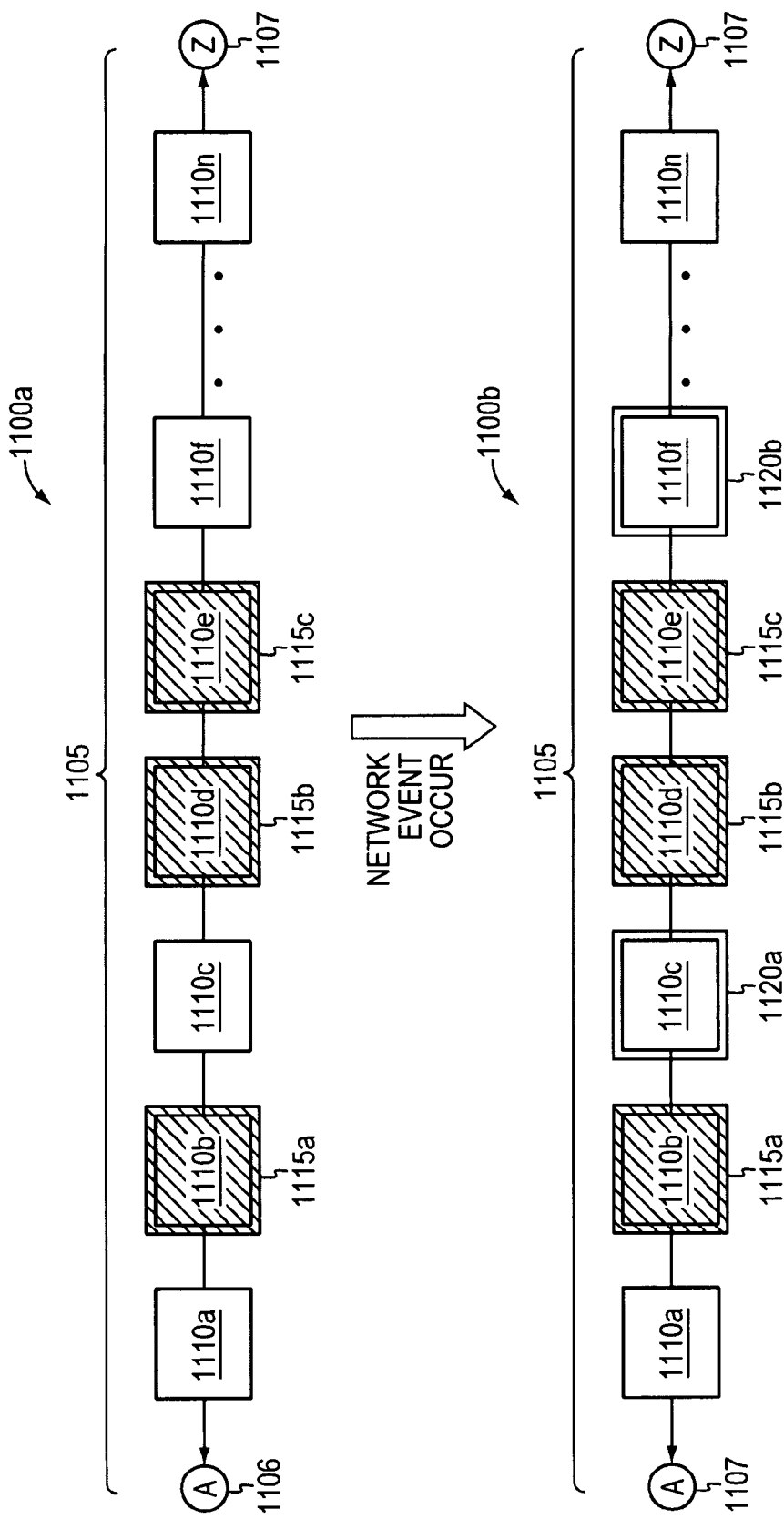
FIG. 11 is a block diagram of an example visual presentation with maintained correlation states of each transport service supporting element, in accordance with an embodiment of the present invention.

In FIG. 11, a visual presentation 1100a visually presents, before a network event occurring, a transport service 1105 between a point A 1106 and a point Z 1107 in terms of a first through an nth transport service supporting element 1110a . . . 1110n, generally 1110a-n.

An embodiment illustrated in FIG. 11 maintains a correlation state for each of the transport service supporting elements 1110a-n. The maintained correlation state indicates whether status information from a transport service supporting element is to be collected in an event a network event affects a transport service. Additionally, the maintained correlation state indicates whether a network event affecting a transport service supporting element is to be indicated in an event the network event affects the transport service.

The embodiment, based on the maintained correlation state for each of the transport service supporting elements 1110a-n, provides a correlation state indicator (a visual cue) 1115. In the illustrated example, the correlation state indicators 1115a-c indicate that for the transport service supporting elements 1110b, 1110d and 1110e, status information is not collected and a network event affecting a transport service supporting element is not indicated in an event the network event affects the transport service 1105.

Further in FIG. 11, a visual presentation 1100b visually presents, after a network event occurring, the transport service 1105 in terms of affected transport service supporting elements 1110c and 1110f (indicated by network event indicators 1120a and 1120b) and the transport service supporting elements 1110b, 1110d and 1110e whose correlation states indicate that status information is not collected and a network event affecting a transport service supporting element is not indicated. In this way a viewer visually recognizes for which transport service supporting elements, status information is not collected and a network event affecting a transport service supporting element is not indicated, in an event a network event affects transport service.

Because status information from the transport service supporting elements 1110b, 1110d and 1110e are not collected nor is a network event affecting the transport service supporting elements 1110b, 1110d and 1110e indicated, the network event affecting the transport service 1105 may or may not be affecting the transport service supporting elements 1110b, 1110d and 1110e. As such, the embodiment may reduce the number of alarms presented. However, in contrast to merely suppressing alarms, the visual presentation 1110b, through the correlation state indicators 1115, still enables a viewer to visually correlate a network event affecting a transport service, with the transport service affected by the network event without having to expand a previous presentation (described in reference to FIGS. 8B-C).

While this invention has been particularly shown and described with references to example embodiments thereof, it will be understood by those skilled in the art that various changes in form and details may be made therein without departing from the scope of the invention encompassed by the appended claims.

It should be understood that the block and flow diagrams (e.g., FIGS. 8A-C, FIGS. 9A-B, and FIGS. 10A-C) may include more or fewer elements, be arranged differently, or be represented differently. It should be understood that implementation may dictate the block/flow/network diagrams and the number of block and flow diagrams illustrating the execution of embodiments of the invention.

It should be understood that elements of the block and flow diagrams (e.g., FIGS. 8A-C, FIGS. 9A-B, and FIGS. 10A-C) described above may be implemented in software, hardware, or firmware. In addition, the elements of the block and flow diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method for displaying a transport service between a first point and a second point in a network, the method comprising:
    by a network manager,
        a) sending one or more configuration requests to (i) physical network elements between a first point and a second point in a network, and (ii) network entities within the physical network elements, the first point and the second point being coupled to different physical network elements, and each of the network entities corresponding to respective hierarchical network layers;
        b) receiving one or more configuration responses from the physical network elements and network entities, the configuration responses being in response to the configuration requests;
        c) graphically representing, within a common display area, the physical network elements, the network entities, and connections between the network entities to form graphical representations based at least in part on the configuration responses; and
        d) simultaneously displaying the graphical representations in a manner showing intra-element connections between network entities within a respective physical network element, inter-element connections between network entities in different physical network elements, and relationships between the network entities to form graphical representations to display a graphical representation of a transport service from the first point to the second point in the network, each of the network entities represented within its physical network element being depicted in relation to its respective network layer.

2. The method of claim 1 wherein graphically representing the connections includes graphically representing physical and logical connections.

3. The method of claim 1 wherein simultaneously displaying the graphical representations includes highlighting at least a subset of the graphical representations.

4. The method of claim 1 further comprising displaying a status of the transport service in a substantially real-time basis.

5. The method of claim 1 further comprising:
a) storing a baseline of the transport service;
b) determining a present state of the transport service; and wherein
c) simultaneously display the graphical representations includes highlighting a difference between the baseline and present states.

6. The method of claim 1 further comprising managing the physical network connections, network entities, adaptions, and connections through Graphical User Interface (GUI) interaction with the graphical representations.

7. The method of claim 1 further comprising selectively displaying expanded and collapsed parallel connections in transport service.

8. The method of claim 1 further comprising displaying the graphical representations to a user in a single display interface.

9. The method of claim 1 wherein simultaneously displaying the graphical representations in a manner showing intra-element connections includes displaying adaptions between network entities, each of the adaptions being displayed connects network entities at different logically vertical network levels within a given physical network element and transports communications, vertically, between the network entities at different levels.

10. The method of claim 1 wherein graphically representing physical network elements is performed by a processor.

11. The method of claim 3 wherein highlighting at least the subset of the graphical representations is selected from a group consisting of: presenting annotating text or graphical information at the graphical representations, adding color, removing color, provide an audio indication, creating shading and removing shading.

12. The method of claim 4 wherein displaying the status of the transport service includes identifying a fault in the transport service based on information received from the physical network elements, network entities, or a network node associated with the transport service.

13. An apparatus for displaying a transport service between a first point and a second point in a network, comprising:
a network manager including
(i) a transport service communications module configured to send one or more configuration requests to physical network elements between a first point and a second point in a network, and network entities within the physical network elements, the first point and the second point being coupled to different physical network elements, and each of the network entities corresponding to respective hierarchical network layers, and to receive one or more configuration responses from the physical network elements and network entities, the configuration responses being in response to the configuration requests;
(ii) a graphical representations module to represent, as graphical representations within a common display area, the physical network elements, the network entities, and connections between the network entities, the graphical representations being based at least in part on the configuration responses; and
(iii) a display control module to display the graphical representations in a simultaneous manner to show intra-node connections between network entities within a respective physical network element, inter-node connections between network entities in different physical network elements, and relationships between the network entities to display a graphical representation of a transport service from the first point to the second point in the network,
each of the network entities represented within its physical network element being depicted in relation to its respective network layer.

14. The apparatus of claim 13 wherein the graphic representations module is made to graphically represent physical and logical connections.

15. The apparatus of claim 13 further comprising the display control module is made to highlight at least a subset of the graphical representations.

16. The apparatus of claim 13 further comprising a status manager made to display a status of the transport service in a substantially real-time basis.

17. The apparatus of claim 13 further comprising:
a) a state manager made to: store a baseline of the transport service, determine a present state of the transport service, and highlight a difference between the baseline and present states.

18. The apparatus of claim 13 wherein the display control module further made to manage the physical network connections, network entities, adaptions, and connections through Graphical User Interface (GUI) interaction with the graphical representations.

19. The apparatus of claim 13 further comprising a transport service manager made to selectively display expanded and collapsed parallel connections in transport service.

20. The apparatus of claim 13 wherein the display control module further made to display the graphical representations to a user in a single display interface.

21. The apparatus of claim 13 wherein the display control module is configured to display adaptions between network entities, each of the adaptions being displayed connects network entities at different logically vertical network levels within a given physical network element and transports communications, vertically, between the network entities at different levels.

22. The apparatus of claim 15 wherein the display control module is made to highlight at least the subset of the graphical representations is selected from a group consisting of: presenting annotating text or graphical information at the graphical representations, adding color, removing color, provide an audio indication, creating shading and removing shading.

23. The apparatus of claim 16 wherein the status manager is further made to identify a fault in the transport service based on information received from the physical network elements, network entities, or a network node associated with the transport service.

* * * * *